US008031954B2

(12) United States Patent
Nakagawa et al.

(10) Patent No.: US 8,031,954 B2
(45) Date of Patent: Oct. 4, 2011

(54) IMAGE ENCODING APPARATUS AND CONTROL METHOD THEREOF USING PREDICTION ENCODING AND PIXEL CLASSIFICATION

(75) Inventors: Akio Nakagawa, Yokohama (JP); Hisashi Ishikawa, Urayasu (JP); Ryoko Mise, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 685 days.

(21) Appl. No.: 12/107,844

(22) Filed: Apr. 23, 2008

(65) Prior Publication Data

US 2008/0292197 A1    Nov. 27, 2008

(30) Foreign Application Priority Data

Apr. 26, 2007  (JP) ................. 2007-117556
Jun. 20, 2007   (JP) ................. 2007-163014

(51) Int. Cl.
 *G06K 9/36* (2006.01)
 *G06K 9/46* (2006.01)
(52) U.S. Cl. ...................................... 382/238
(58) Field of Classification Search .......... 382/232, 382/233, 238, 239, 253; 375/240.16, 240.18, 375/E7.083, E7.088; 358/1.9, 450, 462, 358/534, 536; 345/530, 582; 348/345; 341/67
See application file for complete search history.

(56) References Cited

U.S. PATENT DOCUMENTS

| | | | | |
|---|---|---|---|---|
| 4,215,374 A | * | 7/1980 | Mizuno | 382/238 |
| 4,559,563 A | * | 12/1985 | Joiner, Jr. | 382/238 |
| 4,633,325 A | * | 12/1986 | Usubuchi | 382/238 |
| 5,321,532 A | | 6/1994 | Ishikawa et al. | 358/524 |
| 5,602,549 A | | 2/1997 | Jeong | 341/67 |
| 5,714,950 A | | 2/1998 | Jeong et al. | 341/67 |
| 5,822,507 A | * | 10/1998 | Uda et al. | 358/1.15 |
| 5,903,360 A | | 5/1999 | Honma et al. | 358/450 |
| 5,926,574 A | | 7/1999 | Nishikawa et al. | 382/239 |
| 6,188,794 B1 | * | 2/2001 | Nishikawa et al. | 382/238 |
| 6,549,576 B1 | * | 4/2003 | Moriyoshi | 375/240.16 |
| 6,611,625 B1 | * | 8/2003 | Son et al. | 382/238 |
| 7,373,004 B2 | * | 5/2008 | Chang et al. | 382/236 |
| 7,843,462 B2 | * | 11/2010 | Poon | 345/582 |
| 2005/0030569 A1 | | 2/2005 | Tabata et al. | 358/1.13 |
| 2008/0292197 A1 | * | 11/2008 | Nakagawa et al. | 382/238 |

FOREIGN PATENT DOCUMENTS

| | | |
|---|---|---|
| JP | 06-125278 | 5/1994 |
| JP | 06-164941 | 6/1994 |
| JP | 09-37246 | 2/1997 |
| JP | 09-172636 | 6/1997 |
| JP | 09-275559 | 10/1997 |
| JP | 2003-37843 | 2/2003 |
| JP | 2004-194266 | 7/2004 |
| JP | 2007-088684 | 4/2007 |

* cited by examiner

*Primary Examiner* — Amir Alavi
(74) *Attorney, Agent, or Firm* — Fitzpatrick, Cella, Harper & Scinto

(57) ABSTRACT

According to this invention, encoded data are generated by sorting pixel data in a block according to different scan start positions and different scan routes upon generating encoded data for respective blocks, and encoded data with a smallest data amount of these encoded data is outputted. To this end, a block generation unit inputs blocks each defined by 8×8 pixels from image data to be encoded. Four encoding processing units respectively sort inputted 8×8 pixels according to the information stored in scan start position information storage units and scan route information storage units. The respective encoding processing units generate encoded data based on the sorted pixel data. A selector selects and outputs encoded data with a smallest data size from those generated by the encoding processing units.

11 Claims, 14 Drawing Sheets

FIG. 3A
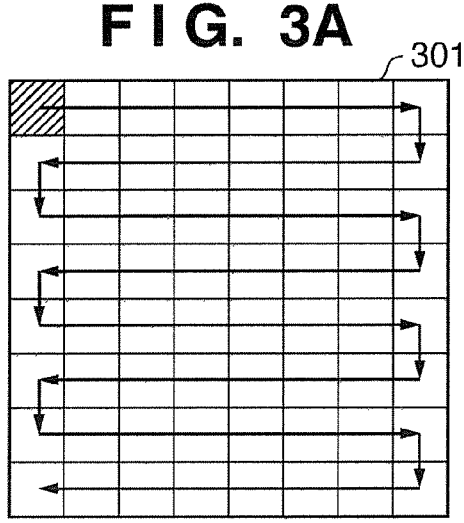
FIG. 3B
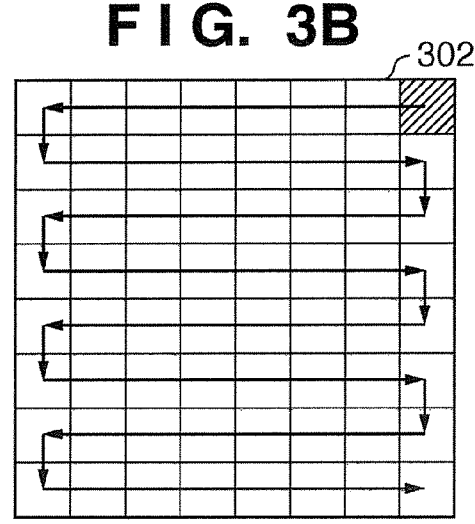
FIG. 3C
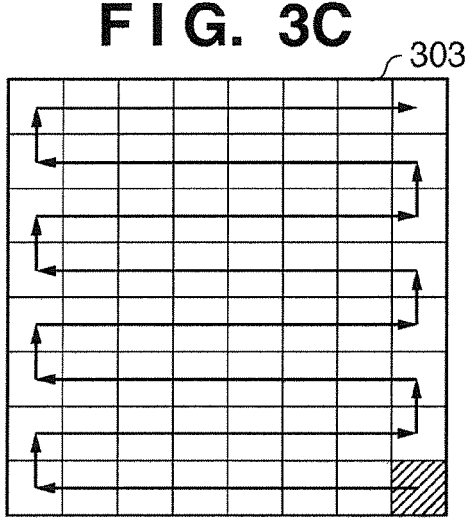
FIG. 3D
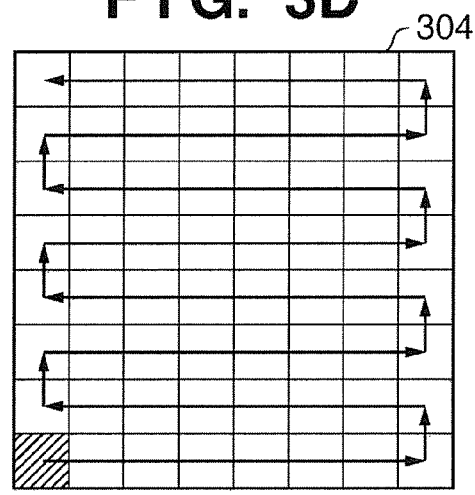
FIG. 3E
| 0 | 0 | 0 | 0 | 0 | 0 | 0 | 0 |
|---|---|---|---|---|---|---|---|
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 1 | 1 |
| 0 | 0 | 0 | 0 | 0 | 1 | 1 | 1 |

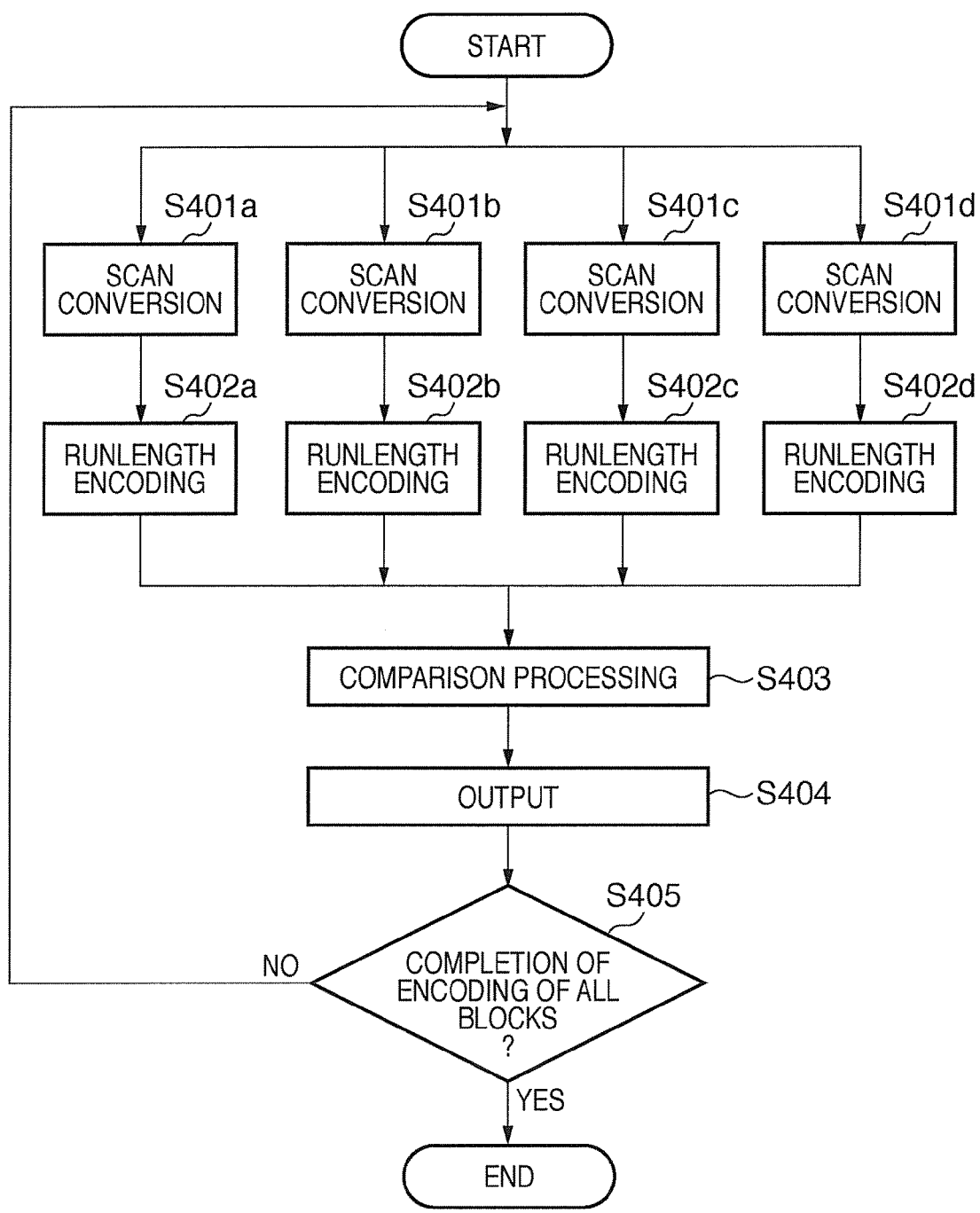

FIG. 7A
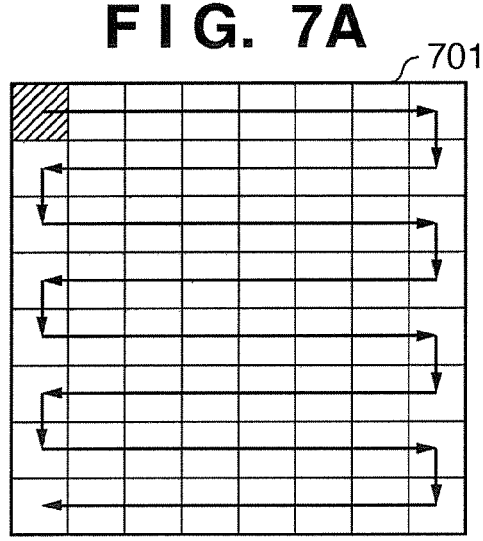
FIG. 7B
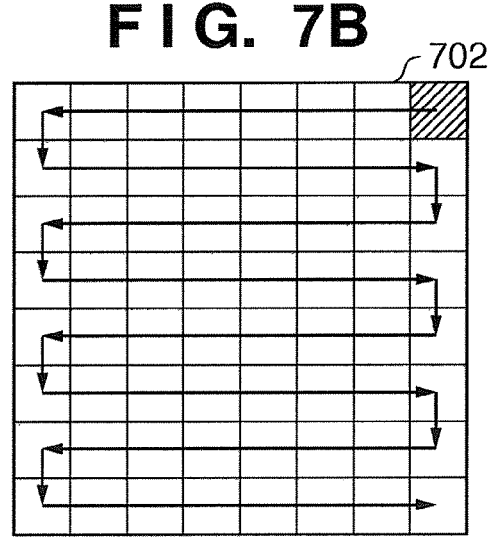
FIG. 7C
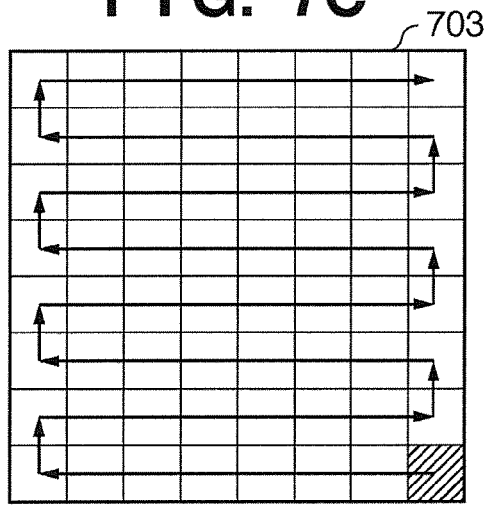
FIG. 7D
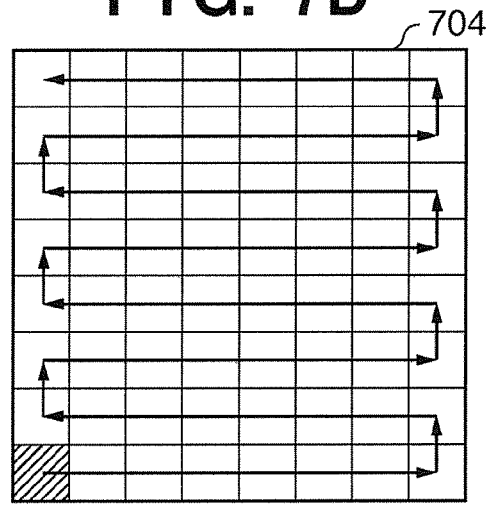
FIG. 7E
| 0 | 0 | 0 | 0 | 0 | 2 | 2 | 2 |
|---|---|---|---|---|---|---|---|
| 0 | 0 | 0 | 0 | 0 | 2 | 2 | 2 |
| 0 | 0 | 0 | 0 | 0 | 2 | 2 | 2 |
| 0 | 0 | 0 | 0 | 0 | 2 | 2 | 2 |
| 2 | 2 | 2 | 2 | 2 | 2 | 2 | 2 |
| 2 | 2 | 2 | 2 | 2 | 2 | 2 | 2 |
| 2 | 2 | 2 | 2 | 2 | 2 | 23 | 20 |
| 0 | 0 | 0 | 0 | 0 | 12 | 20 | 21 |

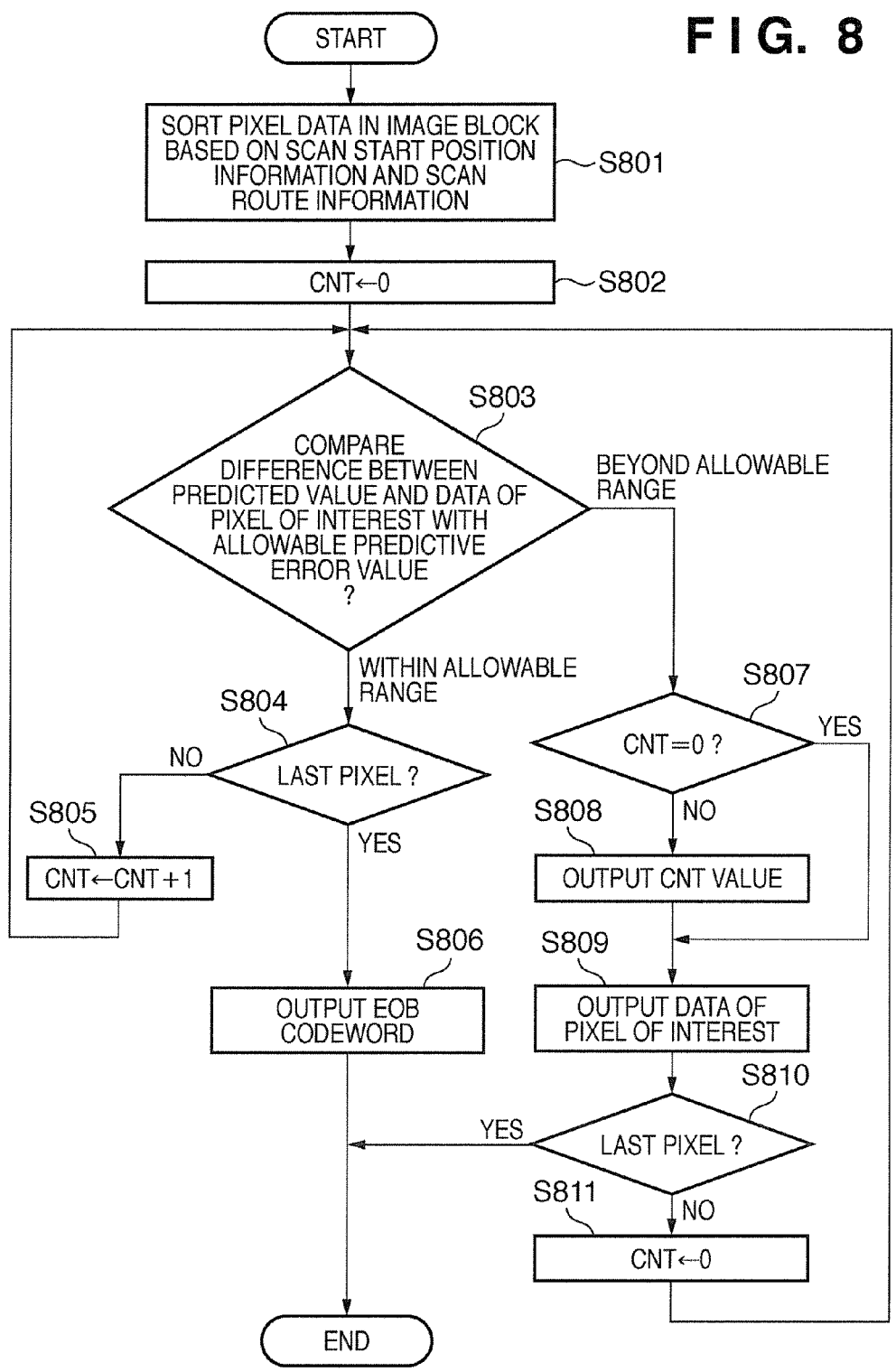

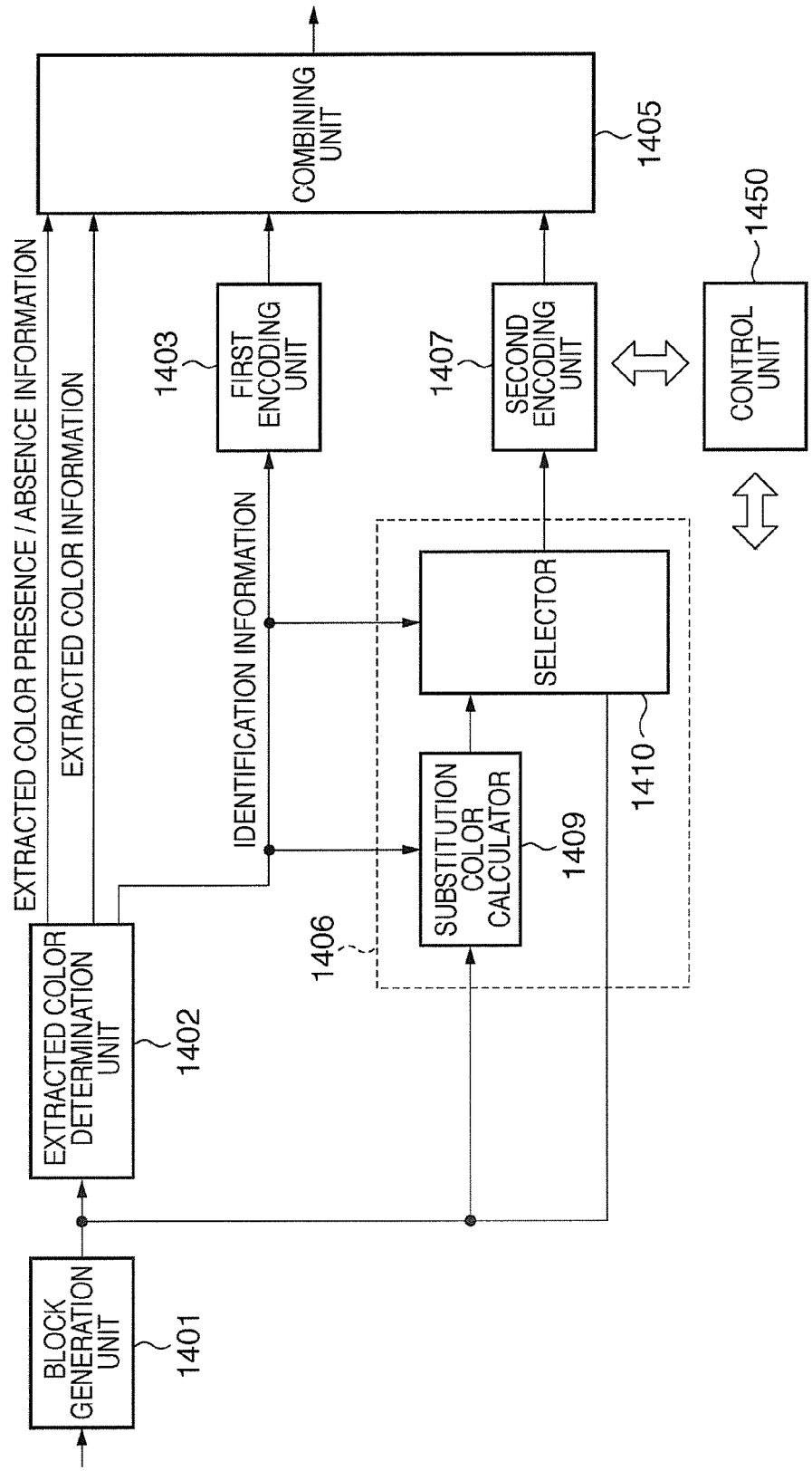

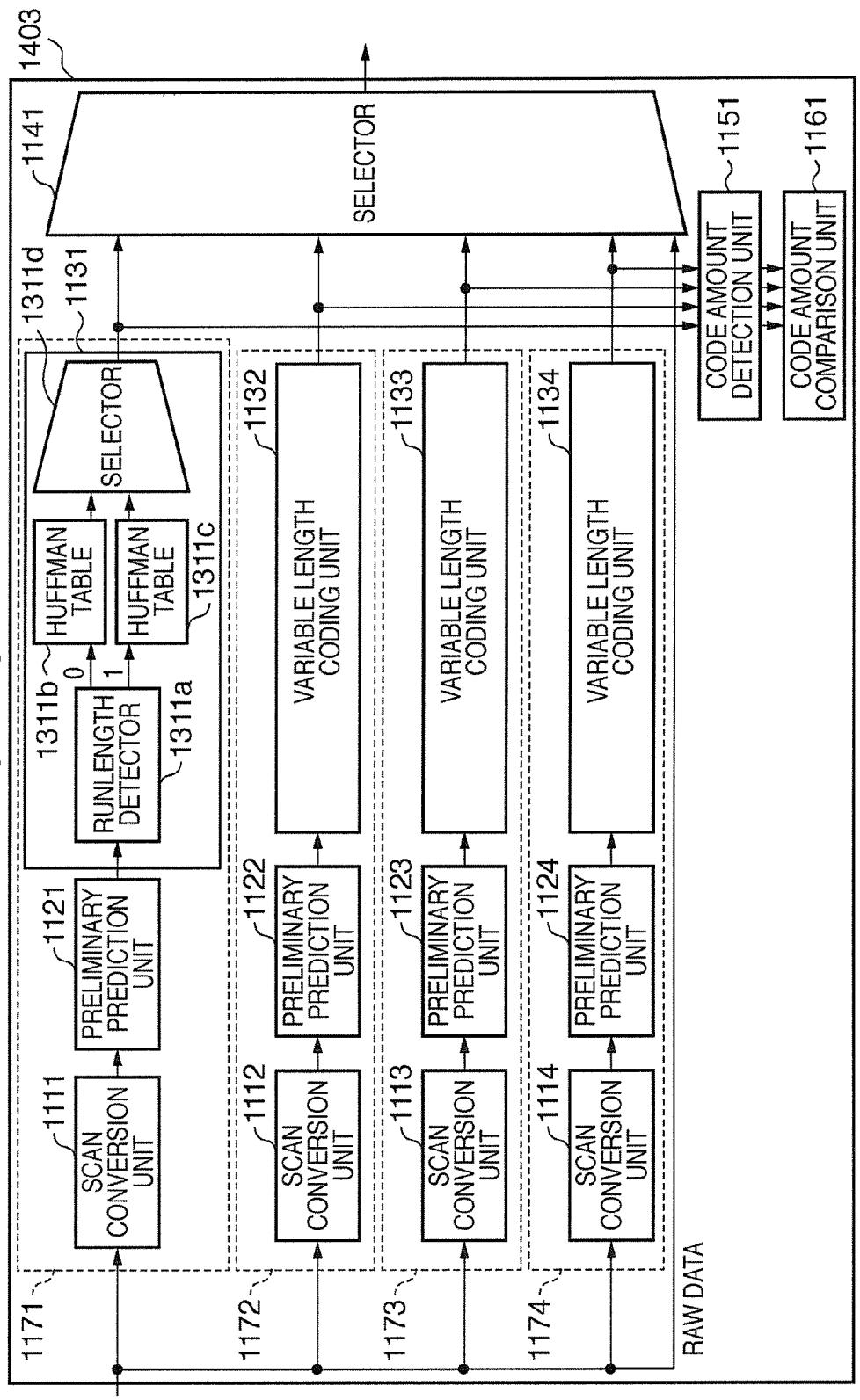

IMAGE ENCODING APPARATUS AND CONTROL METHOD THEREOF USING PREDICTION ENCODING AND PIXEL CLASSIFICATION

BACKGROUND OF THE INVENTION

1. Field of the Invention

The present invention relates to an encoding technique of an image.

2. Description of the Related Art

Conventionally, as a method of encoding an image, methods such as JPEG encoding using orthogonal transformation and the like are available. JPEG encoding will be briefly described below. An image is divided into blocks of 8×8 pixels, and each block undergoes DCT (discrete cosine transformation). 8×8 DCT coefficient values obtained by the DCT are quantized using a quantization table. Since the quantization table normally has larger quantization step widths for higher frequency components, quantized values are smaller and the frequency of occurrence of "0" becomes higher for higher frequency components.

Subsequently, the quantized values are encoded. In this case, different encoding processes are applied to DC and AC components. DC components undergo predictive coding since they have strong correlation between neighboring blocks, and then undergo Huffman encoding. Predictive coding is a method of encoding differences from DC component values of an immediately preceding block. Huffman encoding is an encoding method which assigns a short code to a value with a high frequency of occurrence and a long code to a value with a low frequency of occurrence, thus consequently shortening the overall code length. AC components undergo runlength encoding, and then Huffman encoding. Runlength encoding is an encoding method which encodes a value and its runlength, and the encoding efficiency improves as an identical value runs with a larger length. Note that the encoding efficiency is improved by zigzag-scanning the quantized values to form a run of zero values of high frequency components.

JPEG encoding is a good compression method for natural images. However, for images including characters, line arts, and the like, JPEG encoding readily generates mosquito noise due to loss of high frequency components of images. Also, JPEG encoding readily causes block distortion (block-shaped noise) due to loss of high frequency components and quantization errors of DC components.

By contrast, Japanese Patent Laid-Open No. 09-172636 discloses the following technique. That is, with this technique, an edge emphasizing device, which is adapted to emphasize edge components of inputted image data, does this edge emphasis in accordance with the contents of a quantization table used in quantization means, thereby reducing noise.

Also, Japanese Patent Laid-Open No. 06-164941 discloses the following technique. That is, with this technique, an image is divided into blocks that undergo orthogonal transformation and quantization processing using a criterion for sorting image regions into an important region and the remaining region, and quantization coefficients of blocks which do not belong to the important region are substituted by zero, thus partially maintaining high image quality.

As described above, the conventional encoding processing is executed by defining the upper left corner position in a certain block as a start point and making a raster or zigzag scan from that start point position. On the other hand, in order to improve the encoding efficiency, it is important to increase the probability of a run of identical values during a scan. However, in either the raster or zigzag scan, the scan end position is the lower right corner position of the block. That is, if data different from those which appear so far is located at that lower right corner position, encoded data of all data must be consequently generated, and the conventional encoding leaves much room to improve in terms of the encoding efficiency.

As methods of encoding images, predictive coding, orthogonal transformation encoding, and the like are available. In predictive coding, upon encoding a pixel of interest, its predicted value is calculated from surrounding pixels which have already been encoded, and the difference (predictive error) between that predicted value and an actual value of the pixel of interest is encoded. Normally, a shorter codeword is assigned with decreasing predictive error. Therefore, the amount of encoded data to be generated largely varies depending on the predicted value calculation method.

Hence, a technique for encoding an image by selectively using a plurality of predictive coding methods is known (for example, Japanese Patent Laid-Open No. 9-37246).

Also, a technique for converting a plurality of two-dimensional array data to be encoded into one-dimensional array data (scan method) is known (for example, Japanese Patent Laid-Open No. 2003-037843).

However, in the conventional image encoding techniques, since image data is encoded in a predetermined scan order, the encoding efficiency deteriorates depending on images.

SUMMARY OF THE INVENTION

The present invention has been made in consideration of the aforementioned problems, and has as its object to provide a technique for further improving the encoding efficiency.

In order to achieve the above object, for example, an image encoding apparatus of the present invention comprises the following arrangement. That is, there is provided an image encoding apparatus for encoding image data, comprising:

an input unit adapted to input a plurality of pixel data which express an image block;

a plurality of encoding processing units adapted to generate a plurality of encoded data by scanning and encoding the plurality of pixel data;

a selection unit adapted to select encoded data with a smallest data amount of the encoded data generated by the encoding processing units; and an output unit adapted to output discrimination information indicating the selected encoded data of the plurality of encoded data, and the selected encoded data, wherein at least one of a scan start position and a scan route of each of the encoding processing units is different.

According to the present invention, a plurality of encoding processing units respectively sort pixel data in each block according to different scan start positions and scan routes, and generate encoded data. Then, encoded data with a smallest amount of data is outputted. As a result, an amount of encoded data can be greatly reduced.

Further features of the present invention will become apparent from the following description of exemplary embodiments with reference to the attached drawings.

BRIEF DESCRIPTION OF THE DRAWINGS

FIGS. 3A to 3E show examples of scan routes of respective encoding processing units and data to be encoded according to the second embodiment;

FIG. 4 is a flowchart showing the processing sequence of the second encoding unit according to the second embodiment;

FIGS. 7A to 7E show examples of scan routes of respective encoding processing units and data to be encoded according to the first embodiment;

FIG. 8 is a flowchart showing the encoding processing sequence of each encoding processing unit according to the first embodiment;

FIG. 12 is a block diagram showing the arrangement of an image encoding apparatus according to the fifth embodiment;

FIG. 13 is a block diagram showing details of a first encoding unit shown in FIG. 12.

DESCRIPTION OF THE EMBODIMENTS

Embodiments according to the present invention will be described in detail hereinafter with reference to the accompanying drawings.

First Embodiment

Figure 6:
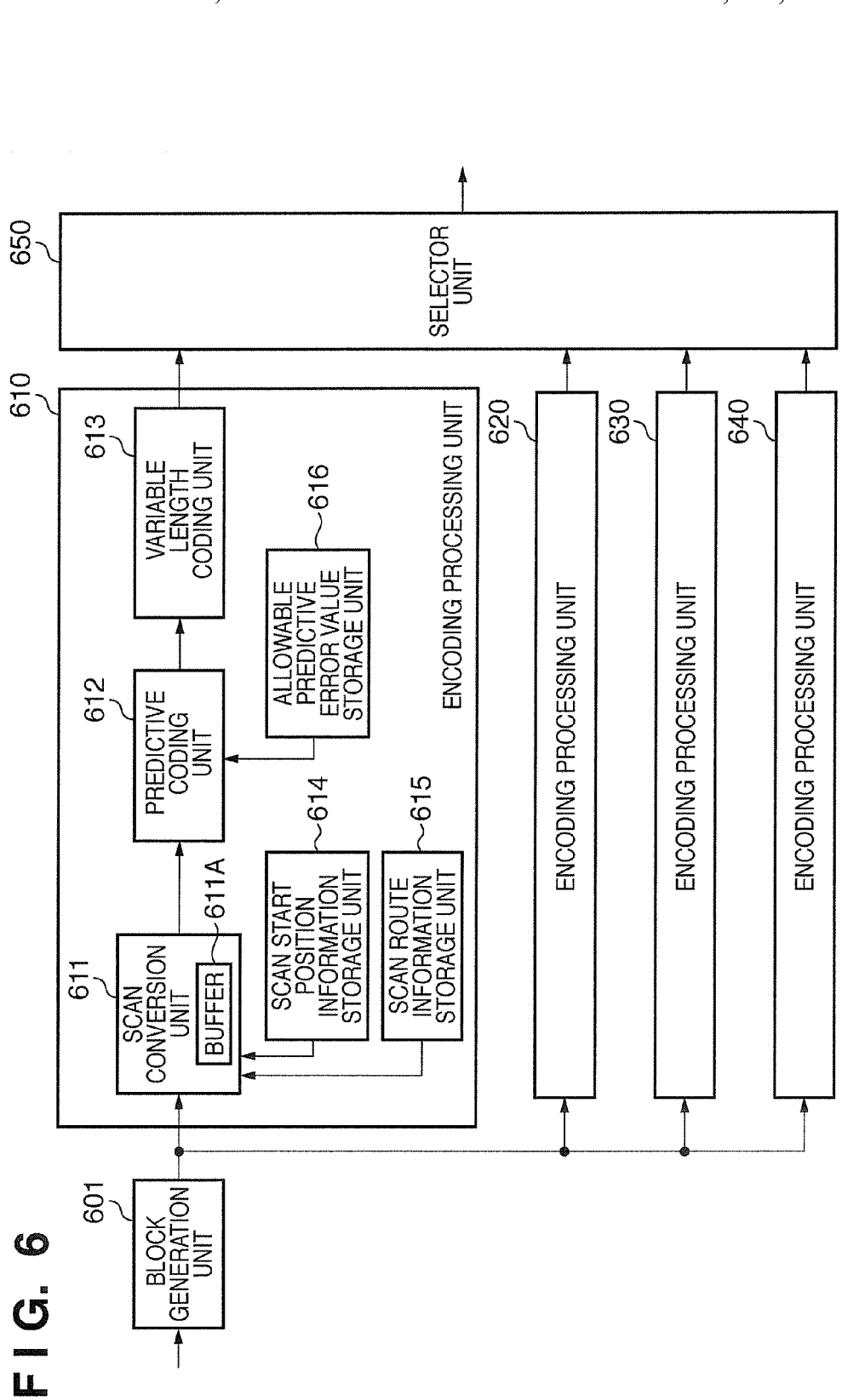
FIG. 6 is a block diagram showing the arrangement of an image encoding apparatus according to the first embodiment.

FIG. 6 is a block diagram showing the arrangement of an image encoding apparatus according to the first embodiment.

A block generation unit 601 inputs image data defined by m×n pixels (to be referred to as image block data hereinafter) from image to be encoded. Assume that the inputting order of image block data is a raster scan order for respective blocks. For the sake of simplicity, an image block has a size of 8×8 pixels in the description of this embodiment. Also, a supply source of image data to be encoded is an image scanner. However, the supply source may be a storage medium which stores that image data, or a rendering unit which generates image data based on print data. Hence, the types of supply sources are not particularly limited.

The apparatus of this embodiment comprises a plurality of encoding processing units which receive image block data and generate encoded data. In FIG. 6, reference numerals 610, 620, 630, and 640 denote such encoding processing units. Note that the number of encoding processing units is four in FIG. 6. However, the number of encoding processing units does not limit the present invention.

The encoding processing units 610, 620, 630, and 640 respectively encode image block data supplied from the block generation unit 601, generate encoded data, and output the generated encoded data to a selector unit 650.

The selector unit 650 selects one with the smallest amount of encoded data (the smallest number of bits) of the encoded data outputted from the encoding processing units 610, 620, 630, and 640. The selector unit 650 then generates discrimination information indicating the selected encoded data. The selector unit 650 outputs the discrimination information first, and then outputs the selected encoded data. In this embodiment, since there are four encoding processing units, this discrimination information can be specified by 2 bits.

An overview of the processing of the image encoding apparatus of this embodiment is as has been described above. The encoding processing unit 610 will be described in more detail below. As will be apparent from the following description, the encoding processing units 610, 620, 630, and 640 have the same hardware arrangement. However, scan start position information storage units and scan route information storage units of the encoding processing units 610, 620, 630, and 640 respectively store different pieces of information. The scan start position information storage unit and scan route information storage unit comprise rewritable memories (registers). This is because the need for independent circuit designs of these four encoding processing units 610, 620, 630, and 640 can be obviated, and the development cost can be reduced accordingly. In the description of this embodiment, predictive error allowable value storage units of the four encoding processing units store identical information.

A scan conversion unit 611 has an internal buffer 611A to store one image block data (8×8 pixel data). After the image block data of 8×8 pixels from the block generation unit 601 is stored in the buffer 611A, the scan conversion unit 611 starts pixel array conversion processing. The scan conversion unit 611 loads scan start position information data (in the format of x- and y-coordinates) stored in a scan start position information storage unit 614, reads out pixel data in the buffer 611A designated by that position, and outputs the readout pixel data to a predictive coding unit 612. After that, the scan conversion unit 611 sequentially loads relative position information stored in a scan route information storage unit 615, and sequentially updates the address (coordinates) required to access the buffer 611A. Every time the address is updated, the scan conversion unit 611 accesses the buffer 611A to read out pixel data, and outputs the readout pixel data to the predictive coding unit 612. In this way, the scan conversion unit 611 generates 64 pixel data of a one-dimensional array by sorting 8×8 pixel data in the inputted image block with reference to the scan start position information storage unit 614 and scan route information storage unit 615, and outputs the generated pixel data to the predictive coding unit 612. The predictive coding unit 612 encodes the sorted pixel data. The relative addresses are stored in the scan route information storage unit 615 so that a scan order always passes neighboring pixels, and only −1, 0, and +1 are stored as both X- and Y-addresses. In this way, the storage capacity of the scan route information storage unit 615 can be reduced. Since one of three values "−1", "0", and "+1" need only be specified for both the X- and Y-addresses, each of relative addresses of X- and Y-coordinates suffices to be expressed by 2 bits. Upon limiting to scan routes in embodiments to be described later, since there are seven different increments (X, Y) of X- and Y-coordinates, i.e., (0, 0), (0, 1), (0, −1), (1, 0), (−1, 0), (1, 1), and (−1, −1), the required number of bits can be reduced to 3 bits by storing increments of X- and Y-coordinates in place of relative addresses of X- and Y-coordinates.

FIG. 7A shows a scan route of the scan conversion unit 611 in the encoding processing unit 610. As shown in FIG. 7A, the scan start position is the upper left corner (hatched pixel) of an image block. When pixels are scanned from that start position to the right, and the right end is reached, those on one line below are scanned along a route from the right end toward the left end. Such scan is repeated.

FIGS. 7B to 7D show scan start positions and scan routes in the scan conversion units in the encoding processing units 620 to 640. As can be understood from FIGS. 7A to 7D, the scan start positions and scan routes in the four encoding processing units are different from each other.

The processing of the predictive coding unit 612 will be described below. This predictive coding unit 612 generates encoded data of each pixel of the 64 pixel data from the scan conversion unit 611 in the order they are inputted, and outputs the generated encoded data.

The encoding algorithm of the predictive coding unit 612 is as follows.

The predictive coding unit 612 has an internal counter, and clears that counter to zero upon starting encoding of image data (64 pixel data) of a block of interest. As for the first pixel data, the predictive coding unit 612 outputs that pixel data and holds the value of that pixel data as a predicted value. Upon reception of the second and subsequent pixel data, the predictive coding unit 612 calculates the absolute value of the difference between the value of a pixel of interest and the predicted value (to be simply referred to as a difference hereinafter), and checks if the difference is equal to or smaller than an allowable predictive error value stored in an allowable predictive error value storage unit 616. If the difference is equal to or smaller than the allowable predictive error value, the predictive coding unit 612 does not output data of the pixel of interest and increments the counter by "1". If it is determined that the difference between data of the pixel of interest and the predicted value exceeds the allowable predictive error value, the redictive coding unit 612 outputs encoded data based on the value held in the counter first. The predictive coding unit 612 then outputs encoded data of the data of the pixel of interest, and updates the predicted value by the value of the pixel of interest as a new predicted value. In this case, the predictive coding unit 612 clears the counter to zero. If it is determined that the difference is equal to or smaller than the allowable predictive error value even when a pixel of interest reaches a last pixel position (the 63rd pixel if the first pixel is the 0-th pixel), the predictive coding unit 612 outputs a pre-set EOB codeword in place of the number of skipped pixels. Note that "EOB" is an abbreviation for "End Of Block".

An example of the processing of the predictive coding unit 612 will be described below. Assume that image block data of 8×8 pixels to be encoded is that shown in FIG. 7E. Also assume that the allowable predictive error value stored in the allowable predictive error value storage unit 616 is "3".

Let (A, B) be predictive encoded data which is generated and outputted by the predictive coding unit 612. A and B respectively mean:

A: "0" when the difference is larger than the allowable predictive error value, or "1" when it is equal to or smaller than the allowable predictive error value B: inputted pixel data when the difference is larger than the allowable predictive error value, or data counted so far when it is equal to or smaller than the allowable predictive error value If the difference is smaller than the allowable predictive error value even when the last pixel in the block is processed, "EOB" is outputted.

Encoded data obtained by scanning the image block data shown in FIG. 7E in the scan route shown in FIG. 7A is as follows:

"(0, 0), (1, 53), (0, 23), (1, 3), (0, 12), (0, 0), EOB"

A variable length coding unit 613 generates a variable length code based on the encoded data, and outputs the generated variable length code to the selector unit 650. The encoding method of the variable length coding unit 613 is not particularly limited (any encoding techniques may be used).

A predictive coding unit in the encoding processing unit 620 generates encoded data by scanning the image block data in FIG. 7E in a scan route shown in FIG. 7B. Encoded data generated in this case is as follows:

"(0, 2), (1, 47), (0, 20), (1, 1), (0, 2), (1, 10), (0, 12), (0, 20), (1, 1)"

A predictive coding unit in the encoding processing unit 630 generates encoded data by scanning the image block data in FIG. 7E in a scan route shown in FIG. 7C. Encoded data generated in this case is as follows:

"(0, 21), (1, 1), (0, 12), (0, 0), (1, 10), (0, 23), (1, 1), (0, 2), EOB"

A predictive coding unit in the encoding processing unit 640 generates encoded data by scanning the image block data in FIG. 7E in a scan route shown in FIG. 7D. Encoded data generated in this case is as follows:

"(0, 0), (1, 4), (0, 12), (0, 20), (1, 3), (0, 2), EOB"

It should be noted that when the predictive coding unit 612 outputs an EOB codeword, it can be determined that data indicated by pixel data expressed by a codeword immediately before that EOB continues to the last pixel. In other words, as the generation timing of an EOB codeword from the predictive coding unit 612 is earlier, the amount of data of encoded data generated by the variable length coding unit 613 is smaller. When the allowable predictive error value stored in the allowable predictive error value storage unit 616 is set to be "0", the encoding processing unit 610 generates lossless encoded data. Therefore, in order to set the value to be stored in the allowable predictive error value storage unit 616 according to a user's designation in terms of the relationship between the amount of code and image quality, the allowable predictive error value storage unit 616 preferably comprises a writable memory.

By repeating the aforementioned sequence for all blocks, encoding of the entire image data to be encoded is completed. Note that the selector unit 650 selects one with a shortest code length of the four encoded data generated based on the block of interest, appends discrimination information (2 bits) indicating the encoding processing unit that generated the selected encoded data to the head of the selected encoded data, and outputs the selected encoded data. At the beginning of the encoding processing, the selector unit 650 generates a file header which includes information required for decoding processing such as the size of an image to be encoded (the numbers of pixels in the horizontal and vertical directions), the precision of each pixel (the number of bits), the type of color space, and the like.

The processing sequence of the scan conversion unit 611 and predictive coding unit 612 of this embodiment will be described below with reference to the flowchart of FIG. 8. FIG. 8 shows the processing sequence for one image block.

In step S801, the scan conversion unit 611 converts the sequence of pixels which form inputted image block data based on respective pieces of information stored in the scan start position information storage unit 614 and scan route information storage unit 615. After that, the process advances to step S802. Note that step S802 and subsequent steps are the processes of the predictive coding unit 612.

In step S802, the predictive coding unit 612 clears an internal counter CNT to zero.

In step S803, the predictive coding unit 612 calculates the difference between data of a pixel of interest inputted from the scan conversion unit 611 and a predicted value, and checks if the difference is equal to or smaller than the allowable predictive error value. When the pixel of interest is the first pixel, the predictive coding unit 612 determines that the difference is larger than the allowable predictive error value, and outputs a value "0" of the counter CNT.

If the difference between the data of the pixel of interest and the predicted value is equal to or smaller than the allowable predictive error value, the process advances to step S804, and the predictive coding unit 612 checks if the pixel of interest is the last pixel (64th pixel). If it is determined that the pixel of interest is not the last pixel, the process advances to step S805. In step S805, the predictive coding unit 612 increments the counter CNT by "1", loads the next pixel data, and executes the process in step S803. If it is determined in step S804 that the pixel of interest is the last pixel, the predictive coding unit 612 outputs an EOB codeword, thus ending this processing.

On the other hand, if it is determined in step S803 that the difference between the data of the pixel of interest and the predicted value is larger than the allowable predictive error value, the process advances to step S807. The predictive coding unit 612 checks in step S807 if the value of the counter CNT is "0".

If it is determined that the value of the counter CNT is "0", the predictive coding unit 612 outputs the data of the pixel of interest in step S809.

If it is determined in step S807 that the value of the counter CNT is other than "0", the predictive coding unit 612 outputs the value of the counter CNT in step S808, and then outputs the data of the pixel of interest in step S809.

After that, the process advances to step S810, and the predictive coding unit 612 checks if the pixel of interest is the last pixel (64th pixel). If it is determined that the pixel of interest is not the last pixel, the predictive coding unit 612 clears the value of the counter CNT to "0", and the process returns to step S803. If it is determined that the pixel of interest is the last pixel, the predictive coding unit 612 ends the encoding processing for one image block.

As described above, according to this embodiment, the four encoding processing units 610, 620, 630, and 640 generate encoded data from different start positions in an image data block according to different scan routes. When the pixel of interest reaches the last pixel while the difference (predictive error) of data of a pixel of interest remains within the allowable range, each of these encoding processing units outputs an EOB codeword. By selecting the shortest encoded data of those generated by these four encoding processing units, encoded with a high compression ratio can be generated.

Upon decoding the encoded data, the sequence opposite to that described above can be executed. That is, a decoding apparatus decodes encoded data that follows 2-bit discrimination information at the head of encoded image block data up to encoded data generated by the predictive coding unit 612, thus generating one-dimensional 64 pixel data. After that, the decoding apparatus sorts the 64 pixel data according to the start position and scan route specified by the discrimination information, and then outputs the sorted pixel data.

In this embodiment, the size of an image block is defined by 8×8 pixels, but this size does not limit the present invention. The present invention can be generally applied to m×n pixels (m and n are integers equal to or larger than 2). Also, the number of encoding processing units is four, and their scan routes are as shown in FIGS. 7A to 7D. However, the numbers of encoding processing units and scan routes are not limited to them. In particular, as is easily understood from the description of the embodiment, the scan start positions and scan routes can be freely set by changing their information.

Second Embodiment

Figure 1:
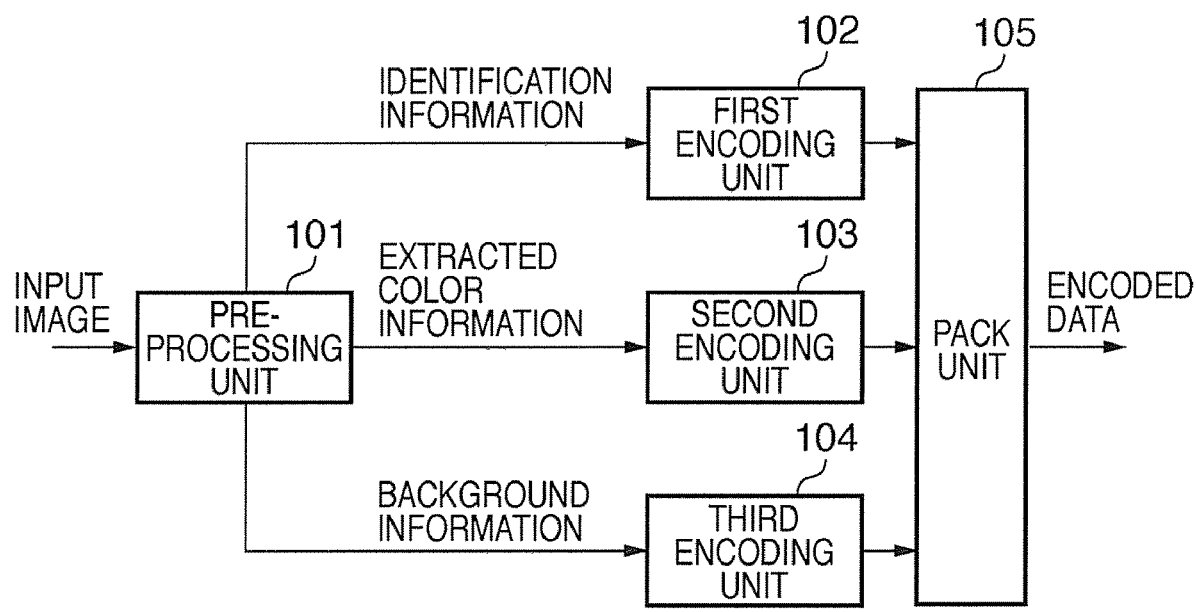
FIG. 1 is a block diagram showing the arrangement of an image encoding apparatus according to the second embodiment.

The second embodiment will be described below. FIG. 1 is a block diagram showing the arrangement of an image encoding apparatus according to the second embodiment.

Referring to FIG. 1, a pre-processing unit 101 receives image data for respective blocks, and executes a series of processes until an image in each inputted block is separated into an extracted color part and background part (non-extracted color part). In this embodiment, the size of each block is defined by 8×8 pixels. However, the sizes of 16×16 pixels, 32×32 pixels, and the like may be used. In this embodiment, assume that the value of each pixel of inputted image data indicates a density.

An example of the separation method of an extracted color part and background part will be described below.

The pre-processing unit 101 calculates an average of densities of all pixel data in a block. The pre-processing unit 101 classifies the densities of the pixel data into a pixel group (to be referred to as a first pixel group hereinafter) having values larger than the average, and a pixel group (to be referred to as a second pixel group hereinafter) having values equal to or smaller than the average. The pre-processing unit 101 calculates the average (first average) of the first pixel group and that (second average) of the second pixel group, and checks if the absolute value of the difference between these averages exceeds a pre-set threshold. If the absolute value of the difference exceeds the threshold, the pre-processing unit 101 notifies a pack unit 105 of a control signal indicating that pixels can be successfully classified. Then, the pre-processing unit 101 determines the first pixel group as that which forms an extracted color part. Note that the second average is used as substitution information to be described later.

If the absolute value of the difference between the first and second averages is equal to or smaller than the pre-set threshold, the pre-processing unit 101 notifies the pack unit 105 of a control signal indicating that the pixels cannot be separated into an extracted color part and background part.

The pre-processing unit 101 outputs binary identification information used to identify whether or not each pixel in the block has an extracted color. The pre-processing unit 101 outputs, as this identification information, "1" for a pixel having the extracted color, and "0" for a pixel having a non-extracted color. In this embodiment, since the size of one block is defined by 8×8 pixels, the identification information of this block is specified by 8×8=64 bits. The sequence of bits is a raster scan order. This identification information is encoded by a subsequent first encoding unit 102. The pre-processing unit 101 outputs extracted color information to a subsequent second encoding unit 103. The second encoding unit 103 encodes the inputted extracted color information.

Furthermore, the pre-processing unit 101 substitutes the values of respective pixels corresponding to the extracted color in the block which is determined to have the extracted color by the aforementioned substitution information (second average). However, pixels determined as a non-extracted color part in the block do not undergo the substitution processing. The pre-processing unit 101 outputs data of 8×8 pixels obtained by the substitution processing to a third encoding unit 104 as background information. As a result, image data of the block indicated by the background information (substituted pixel data) does not include any high frequency components, or includes high frequency components at a low ratio. This background information is lossy encoded by the subsequent third encoding unit 104 (including, e.g., a DCT transformation unit, quantization unit, and entropy encoder).

The first, second, and third encoding units 102, 103, and 104 can respectively adopt independent encoding algorithms.

The pack unit 105 combines the data encoded by the respective encoding units and outputs the combined data. However, as described above, when the pack unit 105 receives the signal indicating that pixels cannot be separated into an extracted color part and background pixel part from the pre-processing unit 101, it outputs only encoded data from the encoding unit 104. In order to allow a decoding apparatus to discriminate if such encoded data for one block includes encoded data of three different types or of one type, the pack unit 105 stores a 1-bit discrimination bit in the head (block header) of the encoded data of one block.

A characteristic feature of the second embodiment lies in the first encoding unit 102 that encodes the aforementioned binary identification information. The first encoding unit 102 will be described in detail below.

Figure 2:
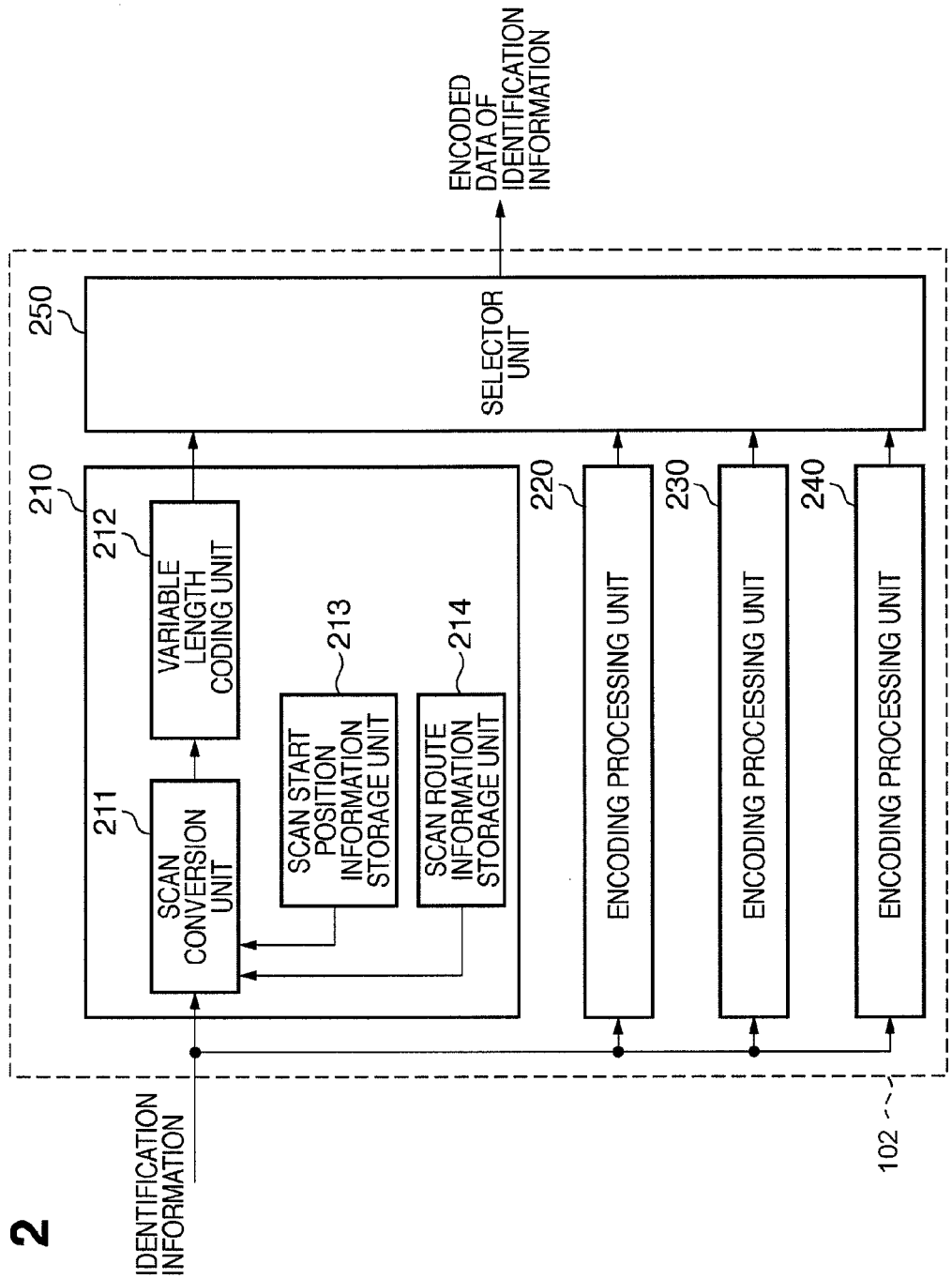
FIG. 2 is a block diagram showing the arrangement of a second encoding unit according to the second embodiment.

FIG. 2 is a block diagram showing the arrangement of the first encoding unit 102 according to the second embodiment.

As shown in FIG. 2, the internal arrangement of the first encoding unit 102 is the same as that shown in FIG. 6. That is, the first encoding unit 102 has a plurality of (four in this embodiment) encoding processing units 210, 220, 230, and 240. A selector unit 250 compares the amount of data of encoded data from the four encoding processing units 210, 220, 230, and 240, and selects encoded data with a smallest amount of data. The selector unit 250 generates and outputs discrimination information indicating the selected encoded data. Then, the selector unit 250 outputs the selected encoded data after the discrimination information.

Since the four encoding processing units have the same hardware arrangement, only the encoding processing unit 210 will be described below.

A scan conversion unit 211 receives the identification information (8×8=64 bits) supplied from the pre-processing unit 101. The scan conversion unit 211 scans and outputs the identification information based on scan start position information stored in a scan start position information storage unit 213 and scan route information stored in a scan route information storage unit 214. That is, the scan conversion unit 211 sorts the 64-bit identification information. The scan conversion unit 211 outputs the sorted identification information to a variable length coding unit 212. The variable length coding unit 212 variable-length encodes the inputted identification information, and outputs generated encoded data to the selector unit 250.

The encoding processing unit 210 has been described. The same applies to the remaining encoding processing units 220, 230, and 240. Different pieces of information are set in scan start position information storage units and scan route information storage units in the encoding processing units.

As described above, the selector unit 250 receives the variable length encoded data from the encoding processing units 210, 220, 230, and 240, compares the amount of code of these data, and selects one encoded data with a smallest amount of code. The selector unit 250 outputs discrimination information (2 bits) used to discriminate one of the encoding processing units 210, 220, 230, and 240, which generated the selected encoded data at the head, and then outputs the selected encoded data.

The scan conversion unit 211 in the encoding processing unit 210 of the second embodiment has the upper left corner position as a scan start position, as shown in FIG. 3A. The scan conversion unit 211 scans from that start position to the right. When the right end is reached, the scan conversion unit 211 scans in turn to the left from the end one line below. Then, the scan conversion unit 211 repeats such scan (horizontal zigzag scan). The scan conversion unit 211 loads position information according to that scan route (scan pattern), and outputs the loaded position information to the variable length coding unit 212.

Scan conversion units in the remaining encoding processing units 220, 230, and 240 sort identification information according to different scan positions and different scan routes, as shown in FIGS. 3B to 3D.

As described above, since identification information of one pixel is binary information, the variable length coding unit 212 encodes binary data, and uses, for example, runlength encoding. The variable length coding unit 212 generates encoded data in a format, for example, [a runlength of values "0", a runlength of values "1", a runlength of values "0", . . . ].

However, when identical values run to the scan end position, the variable length coding unit 212 appends and outputs an EOB codeword in place of the runlength encoded data.

If the identification information of 8×8 bits is as shown in FIG. 3E, encoded data generated by the variable length coding unit 212 of the encoding processing unit 210 based on the scan route of FIG. 3A is "54, 5, EOB". Since encoding processing unit 220 encodes according to a scan route of FIG. 3B, its encoded data is "48, 2, 11, 3". Since encoding processing unit 230 encodes according to a scan route of FIG. 3C, its encoded data is "3, 11, 2, EOB". Since encoding processing unit 240 encodes according to a scan route of FIG. 3D, its encoded data is "5, 5, EOB".

The aforementioned sequence is repeated for all blocks.

Upon decoding, if identification information immediately before an EOB codeword is found is "1", and identification information of 30 bits has been decoded so far, decoding can be done while regarding remaining 34 (=64−30) bits as "0".

The processing of the encoding processing units 210, 220, 230, and 240, and the selector unit 250 will be described below with reference to the flowchart of FIG. 4.

In step S401*a*, the scan conversion unit 211 of the encoding processing unit 210 executes scan conversion (sorting) of identification information based on pieces of information stored in the scan start position information storage unit 213 and scan route information storage unit 214. Scan conversion units of the remaining encoding processing units 220, 230, and 240 execute the same processing in steps S401*b*, S401*c*, and S401*d*.

In step S402*a*, the variable length coding unit 212 of the encoding processing unit 210 variable-length encodes the sorted identification information. At this time, if the identification information remains unchanged until the last bit, the variable length coding unit 212 sets an EOB codeword in place of the runlength encoded data of that identification information. Variable length coding units of the remaining encoding processing units 220, 230, and 240 execute the same processing in steps S402*b*, S402*c*, and S402*d*.

Upon completion of the encoding processing for one block in the encoding processing units 210, 220, 230, and 240, the process advances to step S403. In step S403, the selector unit 250 compares the encoded amounts (encoded data lengths) generated by the respective encoding processing units, and selects data with the smallest amount of code. In step S404, the selector unit 250 outputs discrimination information indicating the selected encoded data at the head, and then outputs the selected encoded data. In this embodiment, since the number of encoding processing units is four, this discrimination information suffices to be expressed by 2 bits.

It is checked in step S405 if blocks to be encoded still remain. If blocks to be encoded still remain, the processes in steps S401a, S401b, S401c, and 401d, and subsequent steps are repeated. Upon completion of the encoding processing for all blocks, the processing ends.

As described above, identification information (binary data) used to identify an extracted color/non-extracted color upon encoding image data for respective blocks can be efficiently encoded.

Third Embodiment

Note that the first embodiment has explained the example using the scan patterns shown in FIGS. 7A to 7D, and the second embodiment has explained the example using the scan patterns shown in FIGS. 3A to 3D. However, the present invention is not limited to these scan patterns. In short, any start positions and scan routes can be set depending on information to be set in scan start information storage units and scan route information storage units.

For example, scan start positions and scan routes shown in FIGS. 5A to 5D may be adopted.

Figure 5A:
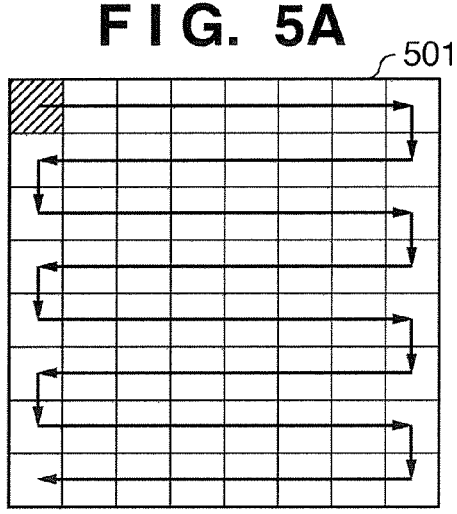
FIGS. 5A to 5E show examples of scan routes and data to be encoded according to the third embodiment.
Figure 5B:
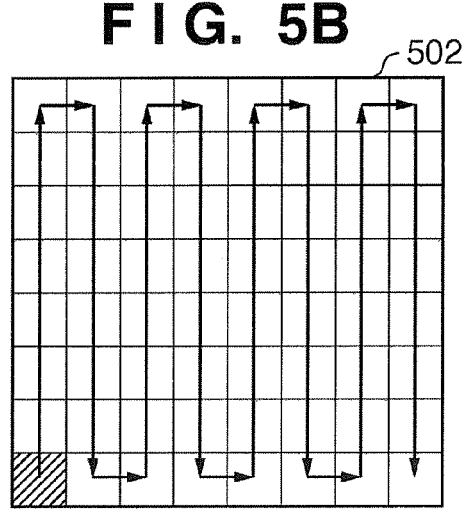
Figure 5C:
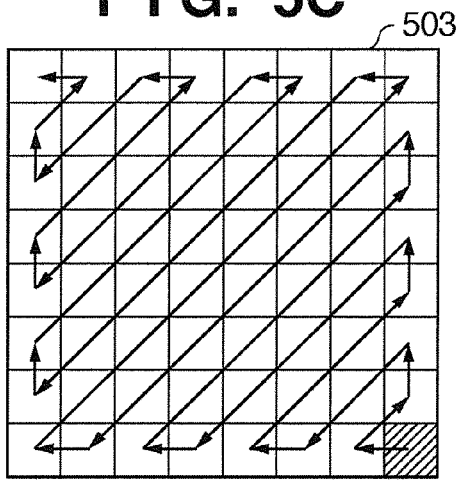
Figure 5D:
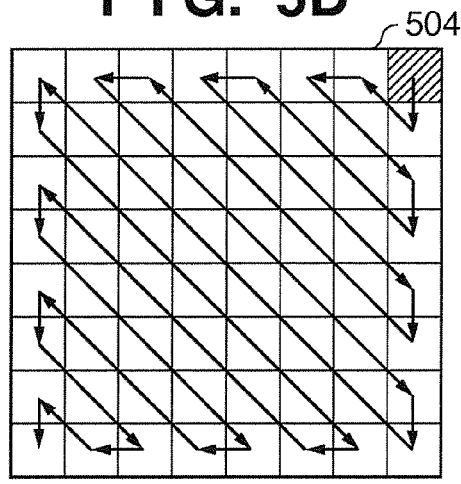

FIG. 5A shows an example in which the upper left corner is set as the scan start position, and a zigzag scan is made in the down direction. FIG. 5B shows an example in which the lower left corner is set as the scan start position, and a zigzag scan is made in the right direction. FIG. 5C shows an example in which the lower right corner is set as the scan start position, and a zigzag scan is made in the up direction. FIG. 5D shows an example in which the upper right corner is set as the scan start position, and a zigzag scan is made in the lower left direction. These settings can be implemented by changing information in a scan start position information storage unit 213 and a scan route information storage unit 214 that stores relative coordinates from the scan start position.

A case will be examined below wherein these scan patterns shown in FIGS. 5A to 5D are applied to the second embodiment. Note that a variable length coding unit in each encoding processing unit alternately outputs encoded data of "0" and "1" runs (identical data) like "0 runlength, 1 runlength, 0 runlength, 1 runlength, . . . " from data to be encoded. If identical data run until the last position information, the variable length coding unit outputs an EOB codeword in place of the codeword of that runlength.

Figure 5E:
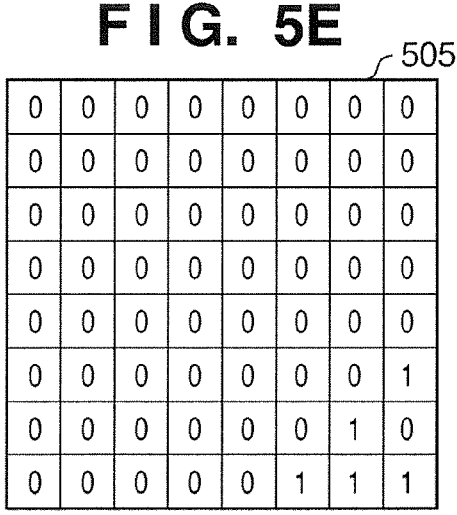

In this case, when data to be encoded (identification information) is that shown in FIG. 5E, encoded data generated upon encoding according to a scan pattern 501 in FIG. 5A is "40, 1, 13, 1, 1, 3, EOB". Encoded data generated upon encoding according to a scan pattern 502 in FIG. 5B is "47, 3, 11, 1, 1, 1". Encoded data generated upon encoding according to a scan pattern 503 in FIG. 5C is "2, 1, 3, EOB". When a scan pattern 504 in FIG. 5D is used, encoded data "15, 1, 12, 2, 12, 2, EOB" is generated. As can be understood from these results, the amount of encoded data generated using the scan pattern 503 in FIG. 5C can be sufficiently smaller than other encoded data.

In consideration of the above description, some combinations of scan start position information and scan route information to be set in the four encoding processing units may be prepared, and the user may store information indicating the selected combination in a file header of an encoded file.

For example, the scan start position and scan route to be set in one encoding processing unit are expressed by (SS, SR). In this embodiment, since there are four encoding processing units, four pairs of scan start positions and scan routes to be set in the four encoding processing units can be expressed by {(SS1, SR1), (SS2, SR2), (SS3, SR3), (SS4, SR4)}. A combination of these four pairs of information is defined by P(i) using a variable i (i=0, 1, 2, . . . ). P(i)={(SS1(i), SR1(i)), (SS2(i), SR2(i)), (SS3(i), SR3(i)), (SS4(i), SR4(i))}

Then, P(i) is stored in a pre-set memory. Upon actual encoding, the variable i is changed in turn from "0", and (SS1(i), SR1(i)), (SS2(i), SR2(i)), (SS3(i), SR3(i)), and (SS4(i), SR4(i)) are set in the respective encoding processing units each time, thus executing encoding processing. Then, the variable i that can minimize the amount of code is determined, and is outputted by storing it in the file header of encoded data.

A decoding apparatus analyzes the file header to extract the variable i to determine four patterns (SS1, SR1), (SS2, SR2), (SS3, SR3), and (SS4, SR4).

As described above, although the four encoding processing units are used, the encoding processing based on more than four combinations of scan start positions and scan routes can be executed.

Note that the third embodiment can be directly reflected in the first embodiment. As described above, according to the third embodiment, the encoding efficiency can be further improved compared to the first and second embodiments.

Fourth Embodiment

Figure 9:
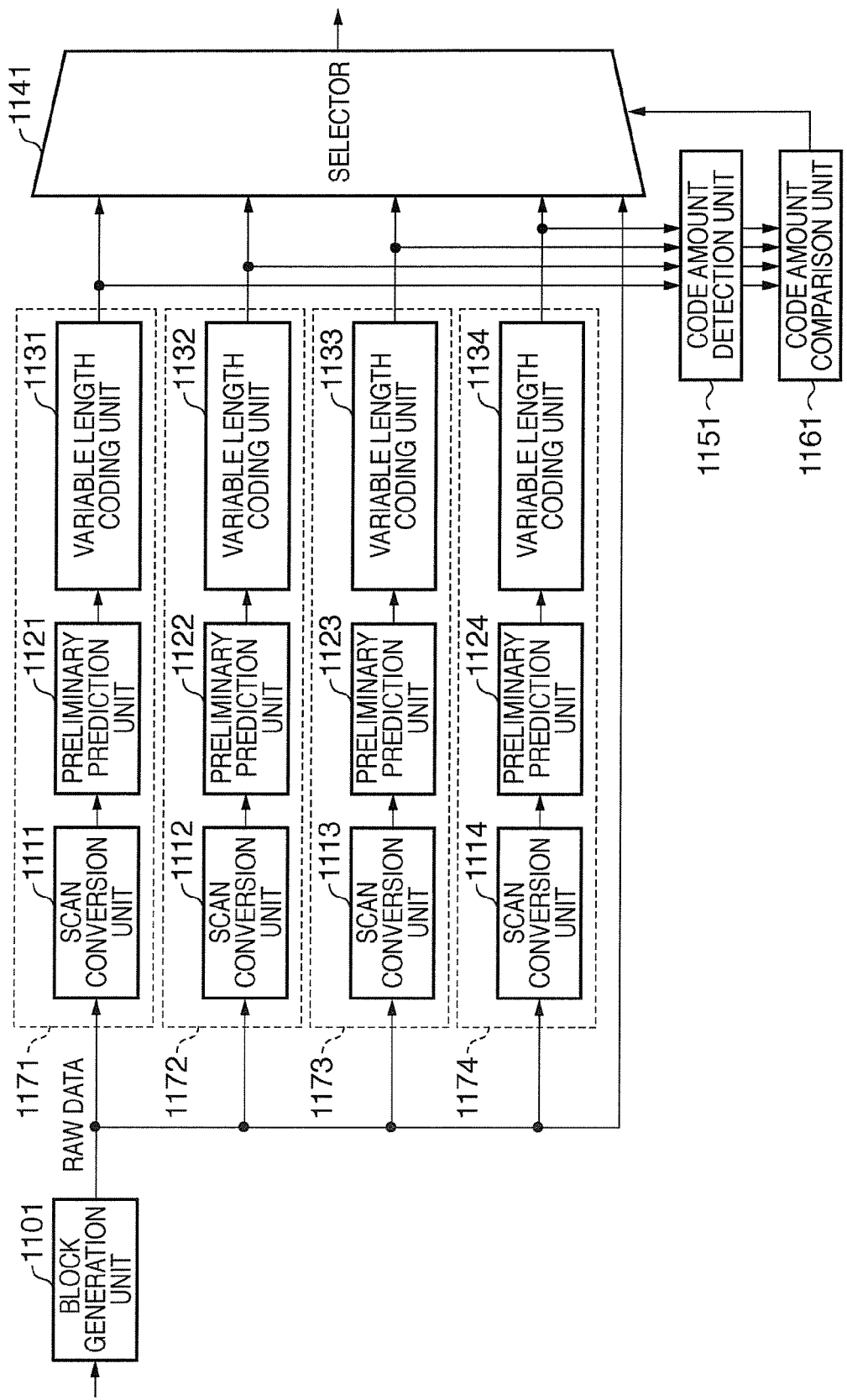
FIG. 9 is a block diagram showing the arrangement of an image encoding apparatus according to the fourth embodiment.

FIG. 9 is a block diagram showing the arrangement of an image encoding apparatus according to the fourth embodiment.

Referring to FIG. 9, reference numeral 1101 denotes a block generation unit; 1171 to 1174, encoding processing units; 1141, a selector; 1151, a code amount detection unit; and 1161, a code amount comparison unit.

The encoding processing unit 1171 has a scan conversion unit 1111, preliminary prediction unit 1121, and variable length coding unit 1131. The encoding processing unit 1172 has a scan conversion unit 1112, preliminary prediction unit 1122, and variable length coding unit 1132. The encoding processing unit 1173 has a scan conversion unit 1113, preliminary prediction unit 1123, and variable length coding unit 1133. The encoding processing unit 1174 has a scan conversion unit 1114, preliminary prediction unit 1124, and variable length coding unit 1134.

Note that the fourth embodiment will exemplify the arrangement including the four encoding processing units. However, the present invention is not limited to such specific number of encoding processing units. In short, the image encoding apparatus can comprise a plurality of encoding processing units.

The block generation unit 1101 inputs image data of a block having a pre-set size (n×m pixels) (to be referred to as block data hereinafter) from image data to be encoded, and outputs the block data to the encoding processing units 1171 to 1174 and selector 1141. In the fourth embodiment, assume that the size of one block is defined by 8×8 pixels, one pixel includes three, R, G, and B components, and each component is expressed by 8 bits. Note that these are merely an example. That is, the block size may be defined by m×n pixels, the color space is not limited to RGB but may be YMC (and K), Lab, YCbCr, and the like, and the number of bits of each component is not limited to 8 bits. Also, a generation source of image data to be inputted to the block generation unit 1101 is an image scanner. However, the generation source may be a rendering unit that renders data based on print data, or a storage unit that stores non-compressed image data as a file (in this case, the apparatus has a drive for accessing the storage medium). Hence, the types of generation sources are not particularly limited.

Figure 10A:
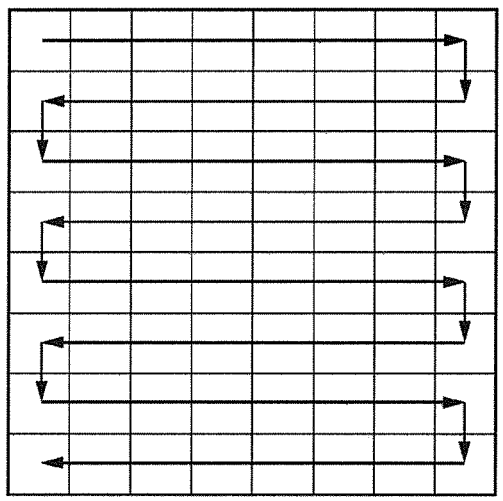
FIGS. 10A to 10D show scan routes of respective scan conversion units according to the fourth embodiment.
Figure 10B:
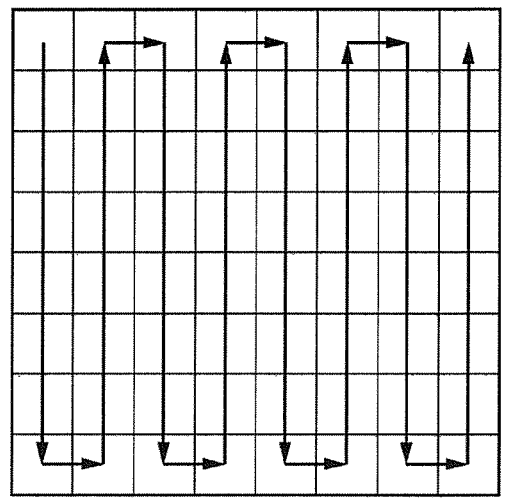
Figure 10C:
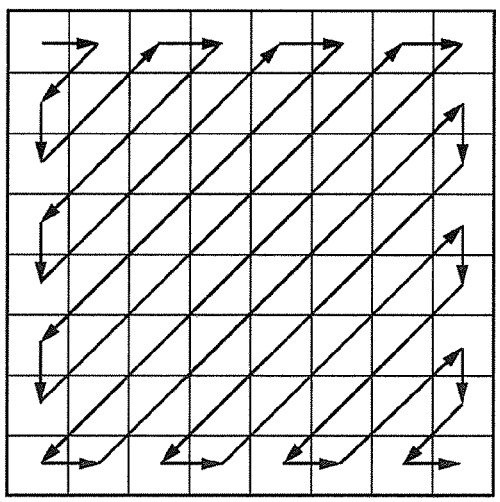
Figure 10D:
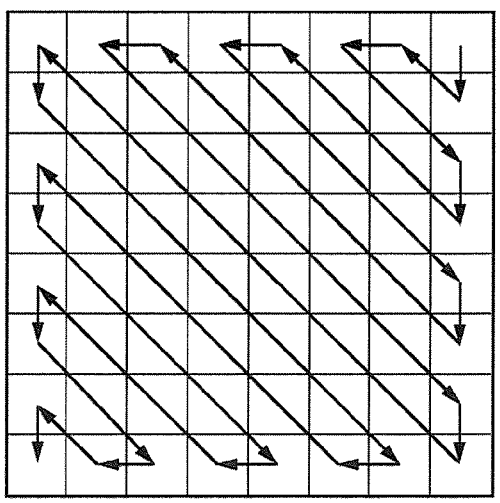

The scan conversion units 1111 to 1114 in the encoding processing units 1171 to 1174 scan (load) the inputted block data according to different scan routes, as shown in FIGS. 10A to 10D, and output the scanned data. That is, the scan conversion units 1111 to 1114 sort the order of pixels in the block data according to the different scan routes (scan orders), and output the sorted pixel data. FIG. 10A shows an example of a vertical zigzag scan; FIG. 10B, a horizontal zigzag scan; FIG. 10C, a 45° zigzag scan; and FIG. 10D, a 135° zigzag scan. Since the fourth embodiment explains an example of 1 block=8×8 pixels, each of the scan conversion units 1111 to 1114 sorts 64 pixel data, and outputs the sorted pixel data.

The preliminary prediction units 1121 to 1124 in the respective encoding processing units respectively execute the same processing and have the same circuit design. Likewise, the variable length coding units 1131 to 1134 have the same circuit design. As a result, since the need for independent designs of these units can be obviated, the design cost can be reduced.

As described above, since the preliminary prediction units 1121 to 1124 and the variable length coding units 1131 to 1134 have the same circuit designs, the preliminary prediction unit 1121 and variable length coding unit 1131 in the encoding processing unit 1171 will be described below.

If one pixel outputted from the scan conversion unit 1111 is defined as a pixel of interest, a pixel inputted immediately before the pixel of interest is defined as a preliminary pixel. The preliminary prediction unit 1121 uses the value of this preliminary pixel as a predicted value of the pixel of interest, calculates the difference between the pixel of interest and predicted value, and outputs the difference to the variable length coding unit 1131 as a predictive error. The preliminary prediction unit 1121 executes this processing for respective color components. Since the fourth embodiment exemplifies three components per pixel, the prediction unit 1121 outputs 64×3 predictive errors. If a pixel outputted from the scan conversion unit 111 is the first pixel after sorting, no previous pixel exists. In this case, the preliminary prediction unit 1121 considers the predicted values of respective components of the pixel of interest (first pixel) as "0" to calculate predictive errors, and outputs the calculated predictive errors to the variable length coding unit 1131. However, this predicted value "0" need not always be "0" since the same value as in a decoding apparatus may be used. Alternatively, raw data (pixel value itself) may be outputted for only the first pixel in place of the predictive error.

The variable length coding unit 1131 predictive encodes (entropy encodes) the predictive errors from the prediction unit 1121, and outputs the encoded data to the selector 1141.

The encoding processing units 1172 to 1174 execute the same processing as described above.

The code amount detection unit 1151 monitors encoded data outputted from the encoding processing units 1171 to 1174, detects the data amounts of encoded data for one block outputted from these encoding processing units, and outputs the detection results to the code amount comparison unit 1161.

Let C1, C2, C3, and C4 be the data amounts (the numbers of bits) of encoded data outputted from the encoding processing units 1171 to 1174, which are detected by the code amount detection unit 1151. Also, let C0 be the data amount of non-encoded data (pixel data arranged in a raster scan order) for one block. In this embodiment, since the number of pixels of one block is 8×8, one pixel includes three components, and one component is expressed by 8 bits, the data amount C0 is "1536 (=8×8×3×8)" bits.

The code amount comparison unit 1161 compares the encoded data amounts {C0, C1, C2, C3, C4} with each other to obtain a smallest value, and outputs a control signal indicating which of {C0, C1, C2, C3, C4} is the smallest value to the selector 1141. Since one out of five candidates is to be specified, this control signal suffices to be expressed by 3 bits. Note that a plurality of candidates having a smallest amount of encoded data may exist. In this case, the code amount comparison unit 1161 outputs a control signal which selects one candidate according to a pre-set priority order.

The selector 1141 generates and outputs a block header in accordance with the control signal from the code amount comparison unit 1161. The selector 1141 selects and outputs, as encoded data of the block of interest, one with a smallest amount of data of the inputted five data, which is specified by the control signal from the code amount comparison unit 1161. The block header stores information indicating a route in which smallest encoded data is generated (simply, the control signal from the code amount comparison unit 1161 can be stored in the header intact).

Practical processing will be described below with reference to FIGS. 11A and 11B.

Assume that an image expressed by inputted 8×8 pixels is an image defined by alternately arranging white and black pixels, i.e., that of a checkered pattern.

Figure 11A:
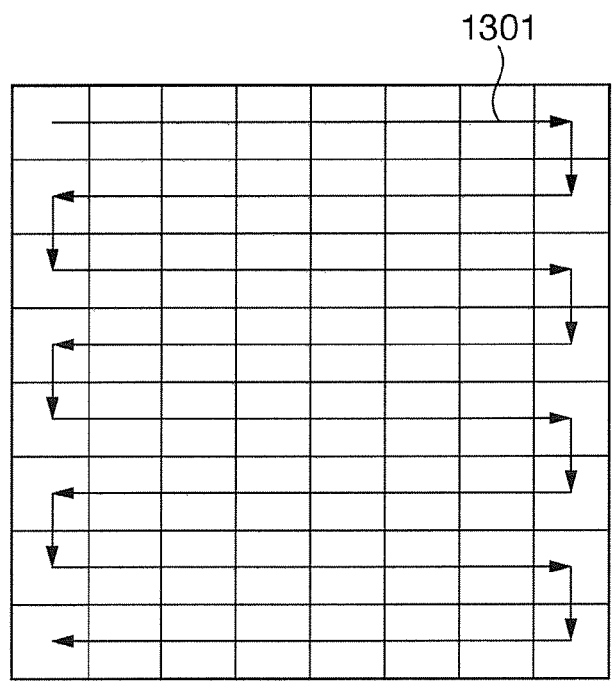
FIGS. 11A and 11B show examples of images which have different encoding efficiencies depending on the scan routes according to the fourth embodiment.

When pixel data of such image are sorted by a normal raster scan or a horizontal zigzag scan according to a route 1301 shown in FIG. 11A, and the sorted pixel data undergo preliminary prediction, many large predictive errors are generated. As described above, in predictive encoding, a shorter codeword is generated with decreasing predictive error. However, when many large predictive errors are generated in this way, many long codewords are generated, resulting in poor encoding efficiency.

Figure 11B:
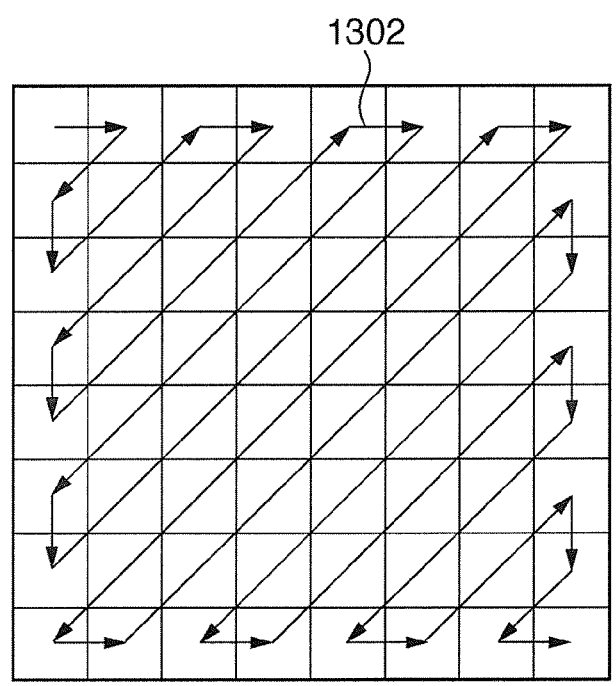

On the other hand, when preliminary prediction is executed by an oblique zigzag scan, as indicated by a route 1302 in FIG. 11B, many predictive errors "0" appear, and the encoding efficiency can be greatly improved.

The variable length coding unit 1131 (the same applies to the units 1132 to 1134) may comprise a processing unit that runlength encodes a data sequence of predictive errors. In this case, runlength encoding is done in such a manner that when the absolute value of a difference as a predictive error is equal to or smaller than a pre-set allowable value, the difference is regarded as "0", and when the difference exceeds the allowable value, a new run starts, thus further improving the encoding efficiency. The user may set this allowable value from, e.g., a console as needed. When the allowable value is "0", lossless encoded data is generated; when the allowable value is "1" or more, lossy encoded data is generated. Alternatively, by applying linear or nonlinear quantization to predictive errors, the amount of code can be reduced.

As described above, the encoding processing units 1171 to 1174 sort pixel data for one inputted block according to different scan routes, and execute preliminary prediction and variable length encoding. The selector 1141 outputs smallest one of encoded data generated by the encoding processing units, which include raster scan data of the original block, as encoded data of the block of interest. By applying this processing to the entire image data to be encoded, encoded data with a high encoding efficiency can be generated. In the fourth embodiment, since the preliminary prediction units 1121 to 1124 and the variable length coding units 1131 to 1134 respectively adopt the same circuit designs, the development cost of the apparatus can be greatly reduced.

The same processing as in FIG. 9 may be implemented by a computer program. In this case, functions corresponding to the processing units are implemented by functions, subroutines, and procedures on the computer program. Since the functions of the preliminary prediction units and variable length coding units can be implemented by common routines, the program size can also be reduced.

Fifth Embodiment

FIG. 12 is a block diagram showing the arrangement of an image encoding apparatus according to the fifth embodiment.

An image encoding apparatus according to the fifth embodiment comprises a control unit 1450 which controls the overall apparatus, block generation unit 1401, extracted color determination unit 1402, first encoding unit 1403, combining unit 1405, substitution unit 1406, and second encoding unit 1407. In the following description, assume that buffer memories are arranged before respective processing units to attain synchronization since the processes of these processing units require different times. The processing contents in the arrangement shown in FIG. 12 will be described below.

The block generation unit 1401 inputs blocks (n×m pixels) each defined by a plurality of pixels from multi-valued image data to be encoded, and outputs block data to the subsequent units. In the fifth embodiment as well, assume that each pixel of image data to be encoded includes R, G, and B components, and each component is expressed by 8 bits (256 tones). Also, one block has a size of 8×8 pixels. The block generation unit 1401 outputs pixel data (R, G, and B components) by scanning 8×8 pixels in a raster scan order. However, the type of color components is not limited to RGB, but YMC may be used. The number of components and the number of bits are not particularly limited.

The extracted color determination unit 1402 checks if 8×8 (=64) pixel data in image data of the inputted block include a pixel corresponding to a high frequency component, and extracts and outputs the color of that pixel as extracted color information that belongs to an extracted color part. The extracted color determination unit 1402 outputs, for each pixel, binary data used to identify if a pixel has an extracted color or non-extracted color (that belongs to a background part). When this binary data is "1", the pixel has an extracted color; when it is "0", the pixel has a non-extracted color. In this embodiment, since one block is defined by 8×8 pixels, the extracted color determination unit 1402 outputs 8×8 binary data. Since each binary data is used to identify if each pixel has an extracted color/non-extracted color, as described above, it will be referred to as identification information hereinafter.

An example of an algorithm for obtaining extracted color information and identification information in the extracted color determination unit 1402 will be described below.

The extracted color determination unit 1402 calculates the average of luminance values of all pixels in a block. The extracted color determination unit 1402 classifies the pixels into a pixel group having luminance values larger than the average (to be referred to as a first pixel group), and a pixel group having luminance values equal to or smaller than the average (to be referred to as a second pixel group hereinafter). Furthermore, the extracted color determination unit 1402 calculates the average of the first pixel group (first average), and that (second average) of the second pixel group, and checks if the absolute value of the difference between these averages exceeds a pre-set threshold.

If the absolute value of the difference between the first and second averages exceeds the threshold, the extracted color determination unit 1402 notifies the combining unit 1405 of extracted color presence/absence information indicating the presence of an extracted color. The extracted color determination unit 1402 considers the second pixel group (pixels with higher densities) as pixels having an extracted color, and outputs its color information to the combining unit 1405 as extracted color information. Also, the extracted color determination unit 1402 outputs identification information (64 bits) which assumes "1" at the position of a pixel having an extracted color or "0" at the position of a pixel having a non-extracted color to the first encoding unit 1403 and substitution unit 1406. Note that the identification information is outputted in a raster scan order.

On the other hand, if the absolute value of the difference between the first and second averages is equal to or smaller than the threshold, the extracted color determination unit 1402 notifies the combining unit 1405 of extracted color presence/absence information indicating the absence of any extracted color. In this case, the extracted color determination unit 1402 outputs all pieces of identification information="0". The extracted color determination unit 1402 may not output extracted color information. This is because upon reception of the extracted color presence/absence information indicating the absence of any extracted color, the combining unit 1405 ignores extracted color information from the extracted color determination unit 1402.

The processing contents of the extracted color determination unit 1402 have been explained. However, it should be noted that such processing contents are merely an example. Details will be apparent from a description to be given later, and the extracted color determination unit 1402 can extract a high frequency component in the block of interest. For example, in this embodiment, pixels with lower luminance values (higher density values) are used as extracted pixels. However, a fewer number of pixels may be used as extracted pixels.

The first encoding unit 1403 encodes the 64-bit identification information outputted from the extracted color determination unit 1402, and outputs the encoded data to the combining unit 1405. Details of the first encoding unit 1403 will be described later.

The substitution unit 1406 will be described below. A substitution color calculator 1409 in the substitution unit 1406 calculates the averages of the respective components of pixels (those of a non-extracted color) with the identification information "0", and outputs a color represented by the calculated averages to a selector 1410 as substitution color data (substitution information). More specifically, let P(x, y) be the value of a certain color component at the position of coordinates (x, y) (x, y=0, 1, . . . , 7) of the block of interest, I(x, y) (=0 or 1) be the identification information, and N be the number of pieces of identification information "0" in the block of interest. Then, an average Ave of one component is given by:

$$Ave = \Sigma\Sigma P(i,j) \times (1 - I(i,j))/N$$

where ΣΣ is an integration function within the range in which variables i and j can assume (0 to 7). The substitution color calculator 1409 outputs the calculated Ave as substitution color data to the selector 1410. When the number of pieces of identification information "0" is zero in the block of interest, i.e., when N=0, the substitution color calculator 1409 may skip the above calculation, and may output an appropriate value. This is because when N=0, the selector 1410 selects and outputs 64 pixel data from the block generation unit 1401.

When identification information is "1", the selector 1410 selects and outputs the substitution color information Ave outputted from the substitution color calculator 1409; when the identification information is "0", the selector 1410 selects and outputs pixel data from the block generation unit 1401. In this way, tone data of the block after substitution is supplied to the combining unit 1405.

In general, an image with a high spatial frequency has low human visual sensitivity, and its tonality may be low. On the other hand, a region with a low spatial frequency has high relative sensitivity, and its tonality becomes important. Put differently, a character or line art is desired to be an image which has a sharp edge and a high spatial frequency. On the other hand, a natural image can have a low spatial frequency, and is desired to have high tonality.

In fact, the substitution unit 1406 of the fifth embodiment substitutes the values of the respective components of pixels determined to have the extracted color by the average of the pixels of the non-extracted color, and outputs the substitution result to the second encoding unit 1407. As a result, an image of a block of 8×8 pixels outputted from the substitution unit 1406 is converted into a continuous tone image with a low spatial frequency.

The second encoding unit 1407 is, for example, a JPEG encoding unit (DCT transformation, quantization, entropy encoding), encodes continuous tone image data of 8×8 pixels outputted from the substitution unit 1406, and outputs the encoded data to the combining unit 1405.

The combining unit 1405 selects and combines the extracted color information, encoded data from the first encoding unit 1403, and encoded data from the second encoding unit 1407 based on the extracted color presence/absence information from the extracted color determination unit 1402, and outputs encoded data for each block. The combining unit 1405 outputs the following encoded data.

When the extracted color presence/absence information indicates the absence of any extracted color;
   a block header including discrimination information indicating the absence of any extracted color +encoded data from the second encoding unit 1407

When the extracted color presence/absence information indicates the presence of an extracted color;
   a block header including discrimination information indicating the presence of the extracted color +extracted color information +encoded data from the first encoding unit 1403+encoded data from the second encoding unit 1407

Details of the first encoding unit 1403 of the fifth embodiment will be described below. FIG. 13 is a block diagram showing the arrangement of the first encoding unit 1403. The same reference numerals in FIG. 13 denote the same components as in FIG. 9 of the fourth embodiment.

As shown in FIG. 13, the first encoding unit 1403 of the fifth embodiment comprises a selector 1141, code amount detection unit 1151, code amount comparison unit 1161, and four encoding processing units 1171 to 1174.

The encoding processing unit 1171 has a scan conversion unit 1111, preliminary prediction unit 1121, and variable length encoding unit 1131. The variable length coding unit 1131 has a runlength detector 1311a which detects the runlength of identification information (binary data). Also, the variable length coding unit 1131 has a Huffman table 1311b which receives a "0" runlength and outputs Huffman encoded data, and a Huffman table 1311c which receives a "1" runlength and outputs Huffman encoded data. The variable length coding unit 1131 has a selector 1311d which alternately selects and outputs encoded data of a "0" run and that of a "1" run.

The encoding processing unit 1172 has a scan conversion unit 1112, preliminary prediction unit 1122, and variable length coding unit 1132. The encoding processing unit 1173 has a scan conversion unit 1113, preliminary prediction unit 1123, and variable length coding unit 1133. The encoding processing unit 1174 has a scan conversion unit 1114, preliminary prediction unit 1124, and variable length coding unit 1134.

Note that the fifth embodiment will exemplify the arrangement including the four encoding processing units. However, the present invention is not limited to such specific number of encoding processing units. That is, the apparatus need only comprise a plurality of encoding processing units. The encoding processing units 1172 to 1174 are the same as the encoding processing unit 1171, except that they comprise the scan conversion units for sorting position information according to different routes. Therefore, the processing contents of the encoding processing unit 1171 will be described below.

The scan conversion unit 1111 sorts identification information (64 bits) by scanning the identification information from the extracted color determination unit 1402 in accordance with a route of FIG. 10A, and outputs the sorted identification information to the preliminary prediction unit 1121.

If one identification information outputted from the scan conversion unit 1111 is defined as identification information of interest, identification inputted immediately before the identification information of interest is defined as preliminary identification information. The preliminary prediction unit 1121 checks if this preliminary identification information and the identification information of interest match, and outputs binary information "0" if they match or "1" if they do not match. When the identification information outputted from the scan conversion unit 1111 is the first information after sorting, no previous identification information exists. In this case, the preliminary prediction unit 1121 outputs the first data intact, and applies the aforementioned processing to subsequent pixels (in order to select a runlength table to be described later, preliminary identification information for the first pixel is considered as "0").

The runlength detector 1311a alternately detects "0" and "1" runs like "0" run→"1" run→"0" run ... from the binary information outputted from the preliminary prediction unit 1121, and alternately outputs the results to one of the Huffman tables 1311b and 1311c. Upon reception of the last (64th) match/mismatch information, the runlength detector 1311a outputs a run detected so far even if the run continues.

The selector 1311d selects and outputs encoded data alternately outputted from the Huffman tables 1311b and 1311c.

The encoding processing units 1171 has been described. The remaining encoding processing units 1172 to 1174 execute the same processing. As differences of these encoding processing units 1171 to 1174, the scan conversion units 1111 to 1114 use different scan routes.

Figure 14:
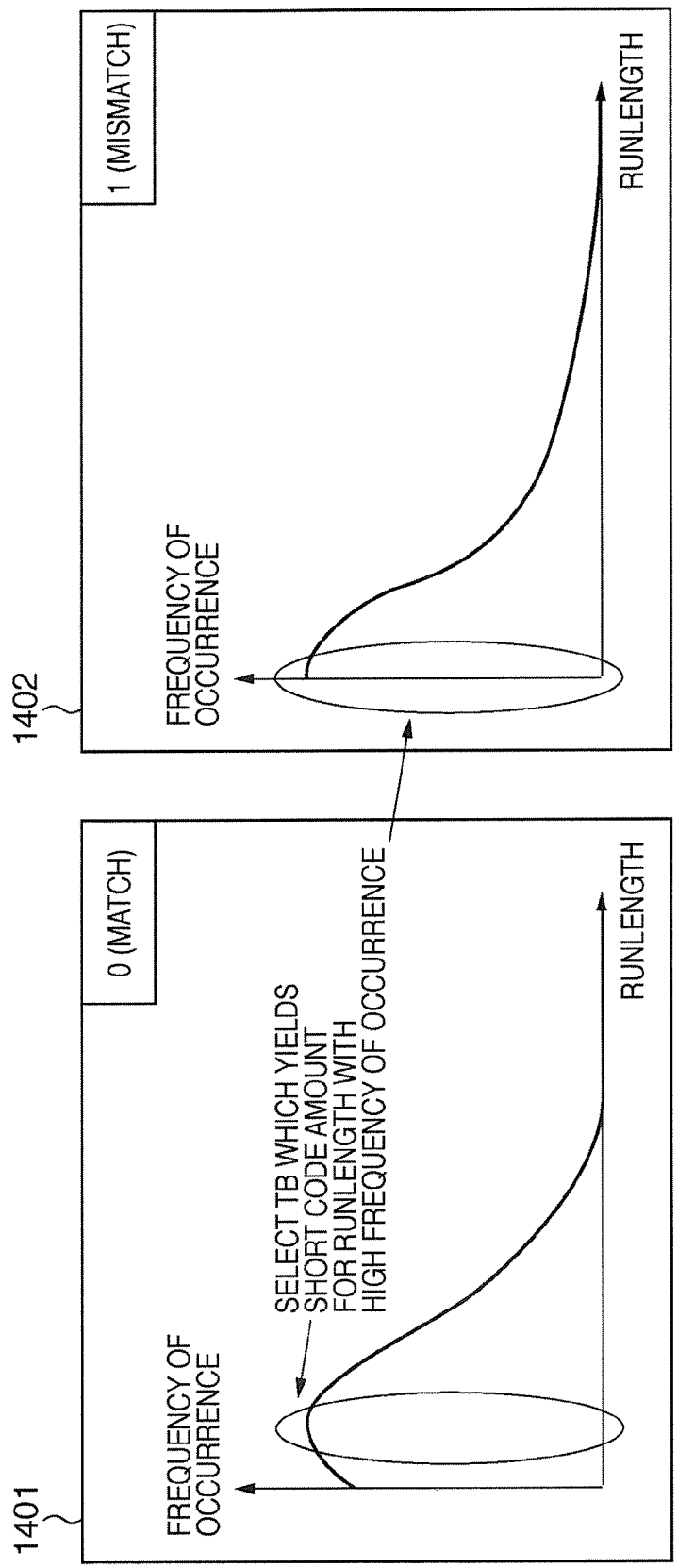
FIG. 14 shows the probability distributions of "0" and "1" runs with respect to runlengths.

In general, since an image has local correlation, the "0" and "1" runs have different probability distributions. FIG. 14 illustrates the probability distributions. As shown in FIG. 14, the probability distribution of "0" runs has a peak in a middle runlength. The probability distribution of "1" runs has a peak at a runlength=1, and the probability of occurrence lowers with increasing runlength. Therefore, when different encoded sequences in the variable length coding are used for "0" and "1" runs, the encoding efficiency can be improved. Hence, in this embodiment, different Huffman tables are used for "0" and "1" runs. When no predictive coding is used, normal runlength encoding (without switching of tables) may be used. As described above, when a fewer number of pixels in a block are used as extracted pixels, since extracted and non-extracted pixels have different distributions of runlengths, the encoding efficiency can be improved by switching encoding tables for the extracted and non-extracted pixels even when no predictive coding is used.

The code amount detection unit 1151 monitors the encoded data outputted from the encoding processing units 1171 to 1174, detects the data amounts of the encoded data of identification information for one block outputted from these encoding processing units, and outputs the detection results to the code amount comparison unit 1161.

Let C1, C2, C3, and C4 be the data amounts (the numbers of bits) of encoded data outputted from the encoding processing units 1171 to 1174, which are detected by the code amount detection unit 1151. Also, let C0 be the data amount of non-encoded data (pieces of position information arranged in a raster scan order) for one block. In the fifth embodiment, since all pieces of position information per block are 64 bits, C0=64.

The code amount comparison unit 1161 compares the encoded data amounts {C0, C1, C2, C3, C4} with each other to obtain a smallest value, and outputs a control signal indicating which of {C0, C1, C2, C3, C4} is the smallest value to the selector 1141. Since one out of five candidates is to be specified, this control signal suffices to be expressed by 3 bits. Note that a plurality of candidates having a smallest amount of encoded data may exist. In this case, the code amount comparison unit 1161 outputs a control signal which selects one candidate according to a pre-set priority order.

The selector 1141 stores discrimination information indicating a route in which smallest encoded data is generated in the head of encoded data of the identification information in accordance with the control signal from the code amount comparison unit 1161. After the discrimination information, the selector 1141 selects and outputs, as encoded data of the block of interest, one with a smallest data amount of the inputted five data, which is specified by the control signal from the code amount comparison unit 1161.

The embodiments according to the present invention have been described. In each of the above embodiments, the number of encoding processing units is four. However, the present invention is not limited to such specific number of encoding processing units. That is, a plurality of encoding processing units need only sort data to be encoded in accordance with different scan start positions and different scan routes.

The functions described in the above embodiments can be implemented by a computer program which is executed by a general-purpose information processing apparatus such as a personal computer or the like. If an OS (operating system) supports multitasking, encoding processes for one block may be executed parallelly. If the encoding processes cannot be executed parallelly, they are executed in turn for each block, and the comparison process may be executed after completion of these encoding processes.

Normally, the computer program is stored in a computer-readable storage medium such as a CD-ROM or the like, and is ready to run when the storage medium is set in a reader (CD-ROM drive or the like) and the program is copied or installed in a system. Therefore, such computer-readable storage medium is included in the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2007-117556, filed Apr. 26, 2007, and 2007-163014, filed Jun. 20, 2007, which are hereby incorporated by reference herein in their entirety.

What is claimed is:

1. An image encoding apparatus for encoding image data, comprising:
   an input unit adapted to input an image block including a plurality of pixels having corresponding pixel data;
   first and second encoding processing units adapted to generate first and second encoded data, respectively, by scanning and predictively encoding the plurality of pixel data;
   a selection unit adapted to select encoded data as the smaller of the first encoded data and the second encoded data; and
   an output unit adapted to output: (1) discrimination information indicating which of the first and second encoded data is the selected encoded data, and (2) the selected encoded data wherein a scan start position of the first encoding processing unit is different from a scan start position of the second encoding processing unit.

2. The apparatus according to claim 1, wherein each of the first and second encoding processing units is further adapted to:
   set a pixel value of a pixel at a scan start position as an initial predicted value;
   if a difference between (1) a pixel value of a pixel of interest obtained according to a scan route and (2) the predicted value falls within a pre-set allowable range,
      count a number of pixels from (1) the pixel set as the predicted value to (2) a pixel of interest;
   if the difference between (1) the pixel value of the pixel of interest and (2) the predicted value exceeds the pre-set allowable range,
      output the number of pixels counted,
      set the pixel value of the pixel of interest as a new predicted value, and
      output the pixel value of the pixel of interest; and
   if the pixel of interest reaches a position of a last pixel while the difference between (1) the pixel value of the pixel of interest and (2) the predicted value remains within the pre-set allowable range,
      output an EOB (End Of Block) codeword.

3. The apparatus according to claim 2, further comprising a setting unit adapted to allow a user to set the allowable range, and store the allowable range in a rewritable storage unit.

4. The apparatus according to claim 1, wherein each of said first and second encoding processing units further comprises a rewritable storage unit storing information indicating a scan start position and information indicating a scan route, and
   wherein each of said first and second encoding processing units is further adapted to scan and predictively encode the plurality of pixel data according to the information indicating the scan start position and the information indicating the scan route.

5. A non-transitory computer-readable storage medium having stored thereon sequences of instructions, the sequences of instructions including instructions which when executed by a computer system cause the computer system to function as an image encoding apparatus according to claim 1.

6. A method of controlling an image encoding apparatus for encoding image data, comprising:
   using at least one computer to perform:
      an input step of inputting an image block including a plurality of pixels having corresponding pixel data;

first and second encoding processing steps each of which including generating first and second encoded data, respectively, by scanning and predictively encoding the plurality of pixel data;
a selection step of selecting encoded data as the smaller of the first encoded data and the second encoded data; and
an output step of outputting (1) discrimination information indicating which of the first and second encoding processing steps has generated the selected encoded data and (2) the selected encoded data,
wherein a scan start position of the first encoding processing step is different from a scan start position of the second encoding processing step.

7. An image encoding apparatus for encoding image data, comprising:
an input unit adapted to input image data for each block defined by a plurality of pixel data from image data to be encoded;
a classification unit adapted to classify pixels in the block inputted by the input unit into pixels having an extracted color and pixels which form a background part as a non-extracted color;
a first encoding unit adapted to encode the extracted color;
a second encoding unit adapted to encode identification information used to identify whether each pixel in the block is a pixel of the extracted color or a pixel of the background part;
a substitution unit adapted to generate substitution information for pixels of the extracted color based on pixels of the background part, and to substitute data of the pixels of the extracted color by the generated substitution information;
a third encoding unit adapted to encode pixel data in the block after substitution by the substitution unit; and
a combining unit adapted to combine and output the encoded data generated by the first, second, and third encoding units,
wherein the second encoding unit comprises:
a plurality of encoding processing units adapted to generate encoded data by scanning the identification information of the inputted block, where the encoding processing units sort the identification information in the block according to different scan start positions and different scan routes, and generate encoded data from the sorted identification information,
a selection unit adapted to compare data amounts of the encoded data generated by the encoding processing units, and to select encoded data with a smallest data amount, and
an output unit adapted to output identification information indicating one of the plurality of encoding processing units corresponding to the encoded data selected by the selection unit, and the selected encoded data.

8. The apparatus according to claim 7, wherein each of the encoding processing units is further adapted to execute run-length encoding from the scan start position according to the scan route, and output an EOB (End Of Block) codeword when identical data runs to a last pixel position in the block.

9. The apparatus according to claim 8, wherein each of the encoding processing units executes scanning and encoding according to information indicating a scan start position and information indicating a scan route, which are stored in a rewritable storage unit.

10. A non-transitory computer-readable storage medium having stored thereon sequences of instructions, the sequences of instructions including instructions which when executed by a computer system cause the computer system to function as an image encoding apparatus according to claim 7.

11. A method of controlling an image encoding apparatus for encoding image data, comprising:
using at least one computer to perform:
an input step of inputting image data for each block defined by a plurality of pixel data from image data to be encoded;
a classification step of classifying pixels in the block inputted in the input step into pixels having an extracted color and pixels which form a background part as a non-extracted color;
a first encoding step of encoding the extracted color;
a second encoding step of encoding identification information used to identify whether each pixel in the block is a pixel of the extracted color or a pixel of the background part;
a substitution step of generating substitution information for pixels of the extracted color based on pixels of the background part, and substituting data of the pixels of the extracted color by the generated substitution information;
a third encoding step of encoding pixel data in the block after substitution in the substitution step; and
a combining step of combining and outputting the encoded data generated in the first, second, and third encoding steps,
wherein the second encoding step comprises:
a plurality of encoding processing steps of generating encoded data by scanning the identification information of the inputted block, wherein in the encoding processing steps, the identification information in the block is sorted according to different scan start positions and different scan routes, and encoded data are generated from the sorted identification information,
a selection step of comparing data amounts of the encoded data generated in the encoding processing steps, and selecting encoded data with a smallest data amount, and
an output step of outputting identification information indicating one of the plurality of encoding processing steps corresponding to the encoded data selected in the selection step, and the selected encoded data.

* * * * *